United States Patent
Lee et al.

(10) Patent No.: US 11,758,582 B2
(45) Date of Patent: *Sep. 12, 2023

(54) METHOD AND APPARATUS FOR SELECTING RESOURCES BASED ON PARTIAL SENSING IN NR V2X

(71) Applicant: LG ELECTRONICS INC., Seoul (KR)

(72) Inventors: Seungmin Lee, Seoul (KR); Daesung Hwang, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/098,965

(22) Filed: Jan. 19, 2023

(65) Prior Publication Data

US 2023/0156789 A1    May 18, 2023

Related U.S. Application Data

(63) Continuation of application No. 17/647,769, filed on Jan. 12, 2022.

(Continued)

(51) Int. Cl.
*H04W 74/08* (2009.01)
*H04W 4/40* (2018.01)
(Continued)

(52) U.S. Cl.
CPC ......... *H04W 74/0808* (2013.01); *H04W 4/40* (2018.02); *H04W 72/20* (2023.01); *H04W 76/28* (2018.02)

(58) Field of Classification Search
CPC ... H04W 74/0808; H04W 76/28; H04W 4/40; H04W 72/1278
See application file for complete search history.

(56) References Cited

U.S. PATENT DOCUMENTS

2020/0229171 A1   7/2020   Khoryaev et al.
2022/0015099 A1   1/2022   Fouad et al.
(Continued)

FOREIGN PATENT DOCUMENTS

KR    20200093517    8/2020

OTHER PUBLICATIONS

PCT International Application No. PCT/KR2022/000525, International Search Report dated Apr. 13, 2022, 3 pages.

(Continued)

*Primary Examiner* — Kevin M Cunningham
(74) *Attorney, Agent, or Firm* — LEE HONG DEGERMAN KANG WAIMEY

(57) ABSTRACT

A method for a first device to perform wireless communication and an apparatus supporting the same are provided. The method comprises, triggering resource selection in a first slot; determining a time interval of a selection window from the first slot based on a remaining packet delay budget (PDB), wherein the selection window includes Y candidate slots; performing sensing for L slots after the first slot; selecting at least one resource for sidelink (SL) transmission within the selection window based on the sensing for the L slots; transmitting, to a second device through a physical sidelink control channel (PSCCH), a first sidelink control information (SCI) for scheduling of a physical sidelink shared channel (PSSCH) and a second SCI; and transmitting, to the second device through the PSSCH, the second SCI and data.

20 Claims, 20 Drawing Sheets

Related U.S. Application Data

(60) Provisional application No. 63/143,947, filed on Jan. 31, 2021, provisional application No. 63/143,926, filed on Jan. 31, 2021, provisional application No. 63/141,957, filed on Jan. 26, 2021, provisional application No. 63/138,713, filed on Jan. 18, 2021, provisional application No. 63/138,781, filed on Jan. 18, 2021, provisional application No. 63/136,613, filed on Jan. 12, 2021.

(51) Int. Cl.
*H04W 76/28* (2018.01)
*H04W 72/20* (2023.01)

(56) References Cited

U.S. PATENT DOCUMENTS

| | | |
|---|---|---|
| 2022/0030575 A1 | 1/2022 | Farag |
| 2022/0095229 A1 | 3/2022 | Ryu et al. |
| 2022/0132568 A1 | 4/2022 | Sarkis et al. |
| 2022/0225408 A1 | 7/2022 | Lee et al. |
| 2023/0084593 A1* | 3/2023 | Hoang .......... H04W 72/02 |

OTHER PUBLICATIONS

Lenovo et al., "Sidelink resource allocation for Power saving," R1-2008917, 3GPP TSG RAN WG1 #103-e, e-Meeting, Nov. 2020, 9 Pages.

Nec, "Discussion on resource allocation for power saving," R1-2008950, 3GPP TSG RAN WG1 #103-e, e-Meeting, Nov. 2020, 8 Pages.

CMCC, "Discussion on resource allocation for power saving," R1-2008031, 3GPP TSG RAN WG1 #103-e, e-Meeting, Nov. 2020, 9 Pages.

U.S. Appl. No. 17/647,769, Office Action dated May 23, 2022, 12 pages.

* cited by examiner

METHOD AND APPARATUS FOR SELECTING RESOURCES BASED ON PARTIAL SENSING IN NR V2X

CROSS-REFERENCE TO RELATED APPLICATIONS

This application is a continuation of U.S. patent application Ser. No. 17/647,769, filed on Jan. 12, 2022, which claims the benefit of U.S. Provisional Patent Application Nos. 63/136,613, filed on Jan. 12, 2021, 63/138,713, filed on Jan. 18, 2021, 63/138,781, filed on Jan. 18, 2021, 63/141,957, filed on Jan. 26, 2021, 63/143,926, filed on Jan. 31, 2021, and 63/143,947, filed on Jan. 31, 2021, the contents of all of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY OF THE DISCLOSURE

Technical Objects

Meanwhile, there may be a case in which the P-UE performing partial sensing is not guaranteed the minimum number of slots required for sensing. Specifically, for example, the P-UE shall determine the end time of the selection window in consideration of the packet delay budget (PDB), and the P-UE shall select Y candidate slots more than a minimum number within the selection window. In this case, if the PDB is tight or the number of Y candidate slots is large, the P-UE may not be guaranteed the minimum number of slots required for sensing. Therefore, when the P-UE is not guaranteed the minimum number of slots required for sensing, a method for resource selection of the P-UE needs to be defined.

Technical Solutions

According to an embodiment, a method for performing wireless communication by a first device may be provided. The method may comprise: triggering resource selection in a first slot; determining a time interval of a selection window from the first slot based on a remaining packet delay budget (PDB), wherein the selection window includes Y candidate slots; performing sensing for L slots after the first slot; selecting at least one resource for sidelink (SL) transmission within the selection window based on the sensing for the L slots; transmitting, to a second device through a physical sidelink control channel (PSCCH), a first sidelink control information (SCI) for scheduling of a physical sidelink shared channel (PSSCH) and a second SCI; and transmitting, to the second device through the PSSCH, the second SCI and data; wherein, based on the L being smaller than a minimum number of slots for the sensing, the at least one resource is selected based on random selection within the selection window, or the at least one resource is selected from the Y candidate slots based on the sensing for the L slots, wherein the Y is a positive integer, and wherein the L is a positive integer.

storing instructions; one or more transceivers; and one or more processors connected to the one or more memories and the one or more transceivers. For example, the one or more processors execute the instructions to: trigger resource selection in a first slot; determine a time interval of a selection window from the first slot based on a remaining packet delay budget (PDB), wherein the selection window includes Y candidate slots; perform sensing for L slots after the first slot; select at least one resource for sidelink (SL) transmission within the selection window based on the sensing for the L slots; transmit, to a second device through a physical sidelink control channel (PSCCH), a first sidelink control information (SCI) for scheduling of a physical sidelink shared channel (PSSCH) and a second SCI; and transmit, to the second device through the PSSCH, the second SCI and data; wherein, based on the L being smaller than a minimum number of slots for the sensing, the at least one resource is selected based on random selection within the selection window, or the at least one resource is selected from the Y candidate slots based on the sensing for the L slots, wherein the Y is a positive integer, and wherein the L is a positive integer.

Effects of the Disclosure

A UE performing a power saving operation may perform an efficient resource selection operation.

DESCRIPTION OF EXEMPLARY EMBODIMENTS

Figure 1:
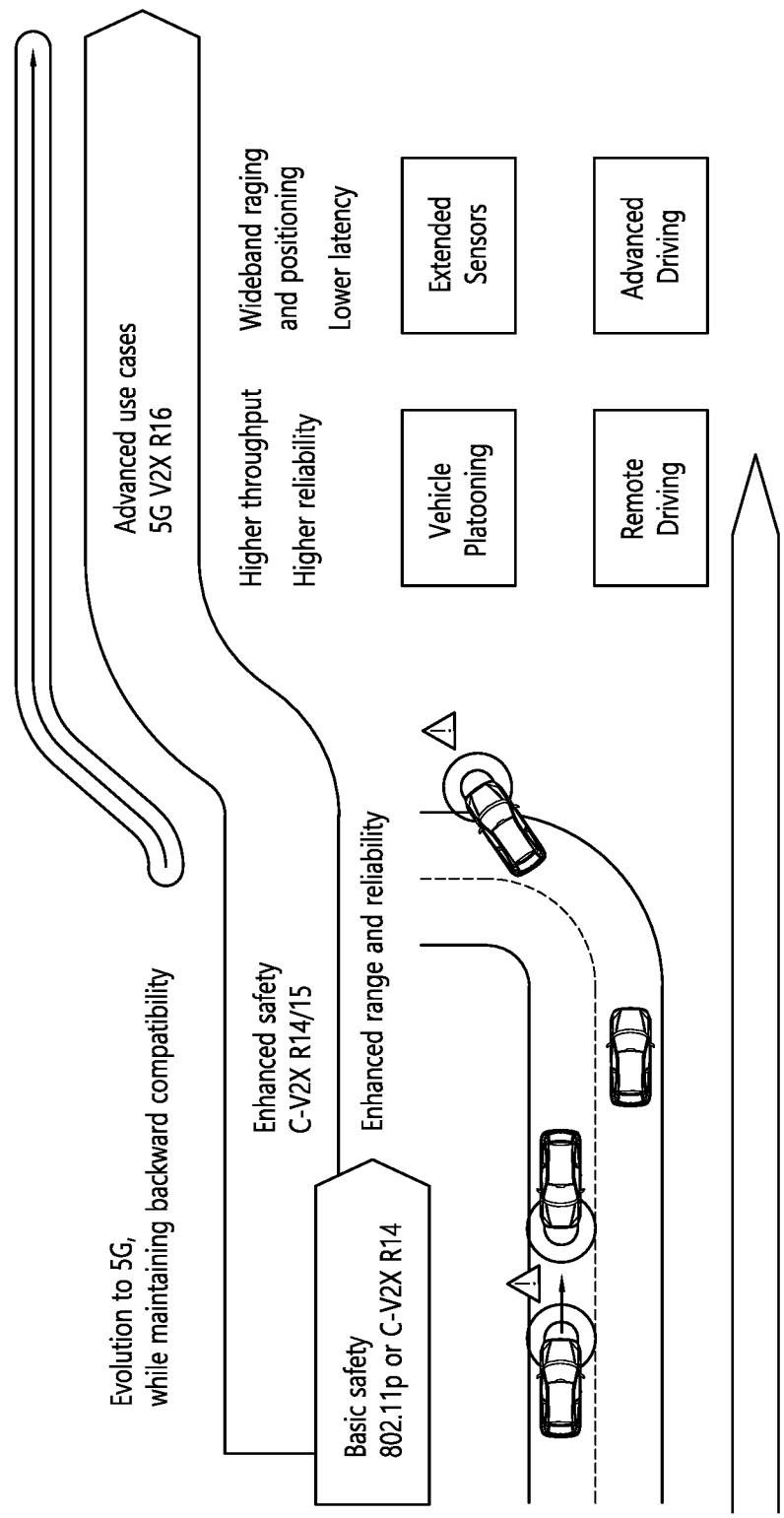
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B".

For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
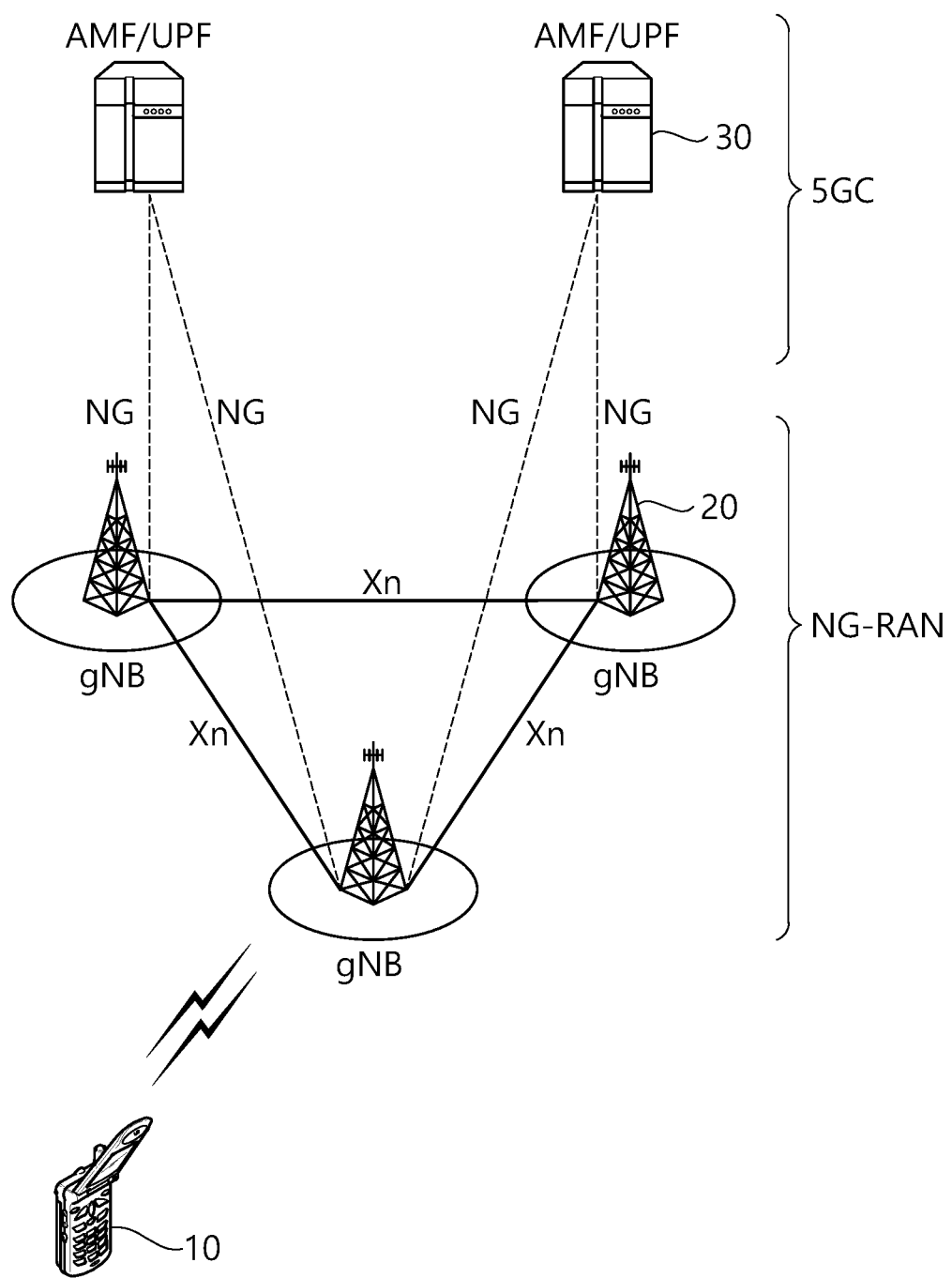
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
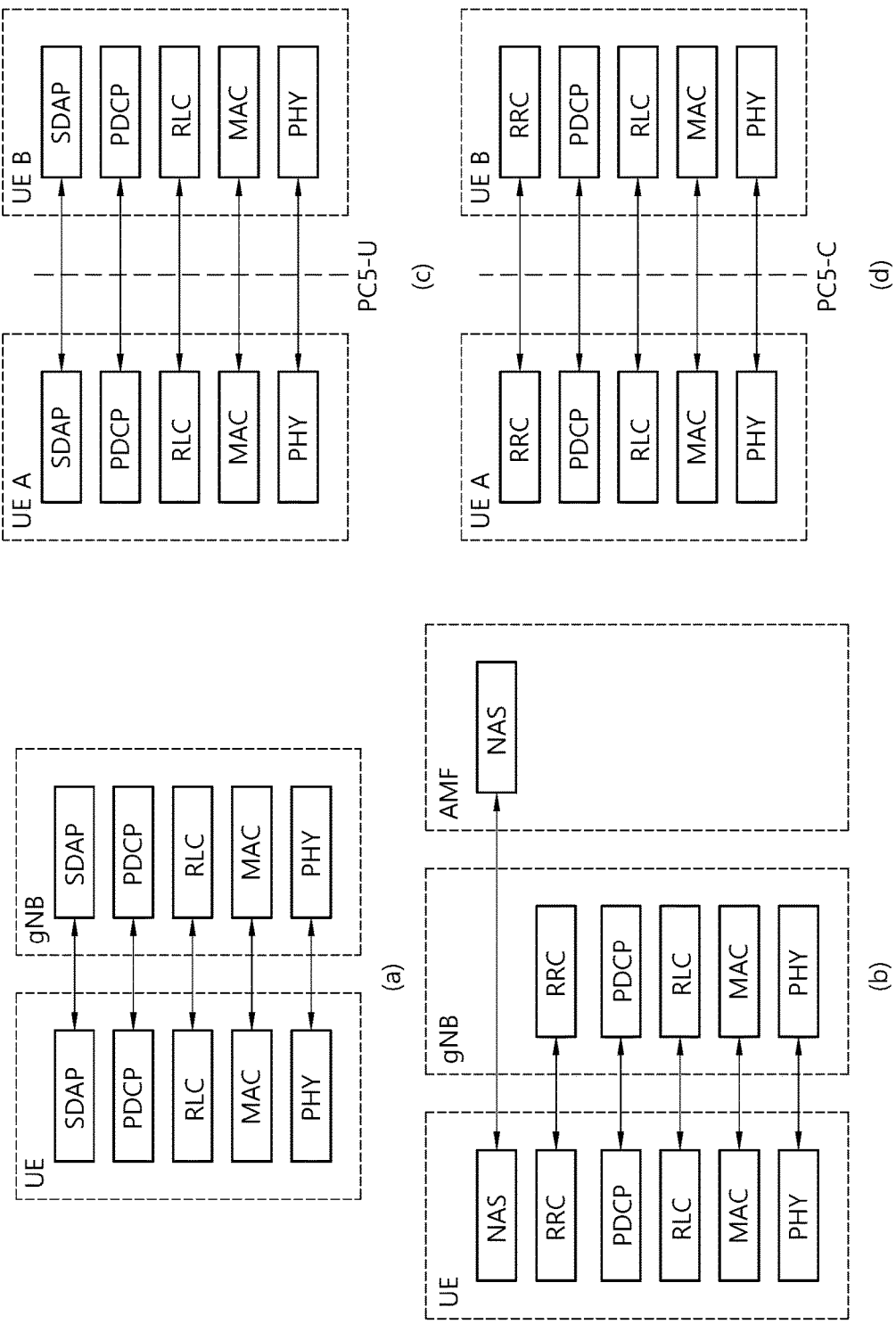
FIG. 3 shows a radio protocol architecture, based on an embodiment of the present disclosure.

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
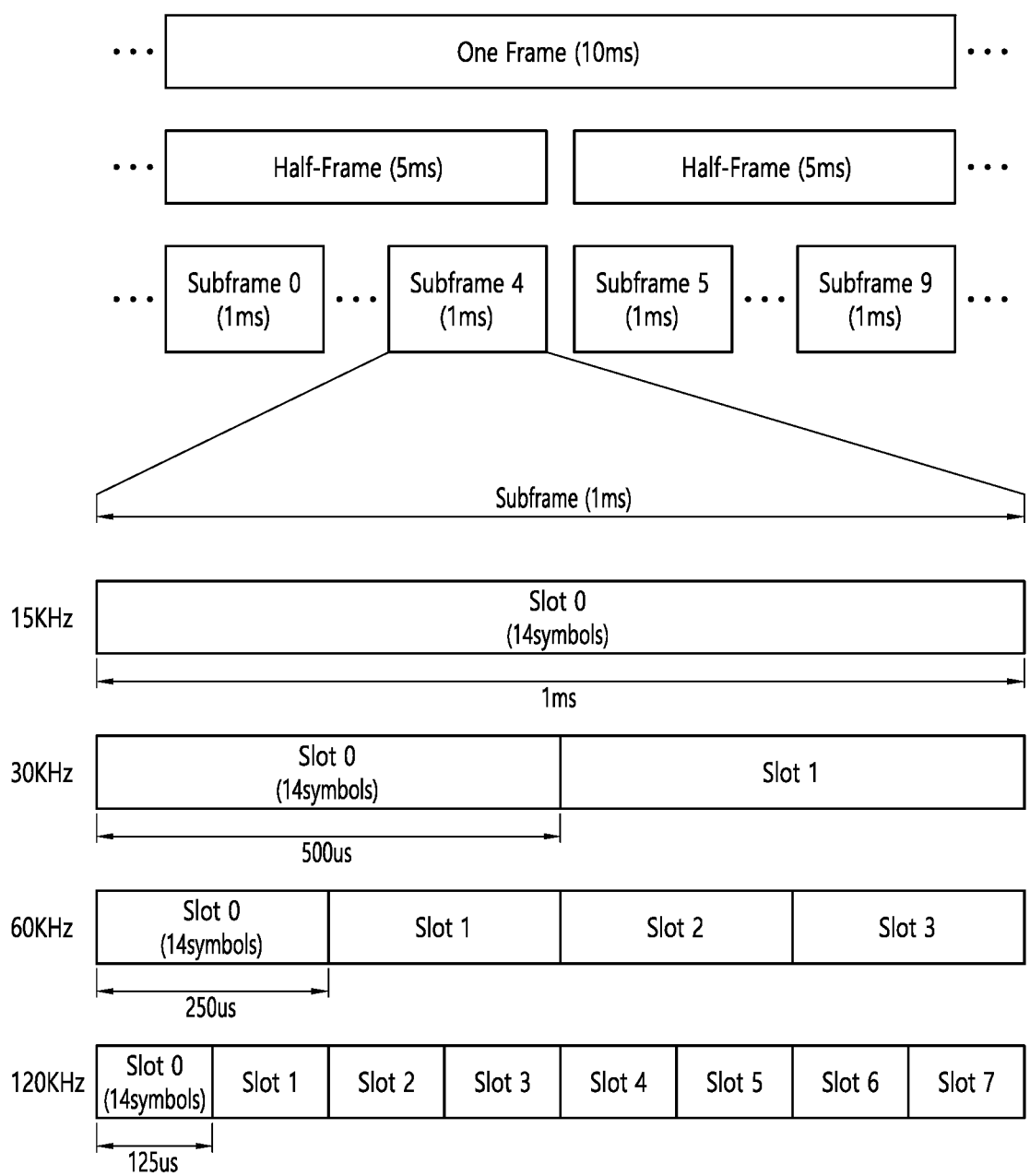
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$) a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
| --- | --- | --- | --- |
| 60 KHz (u = 2) | 12 | 40 | 4 |

In an NR system, OFDM A numerologies e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 5:
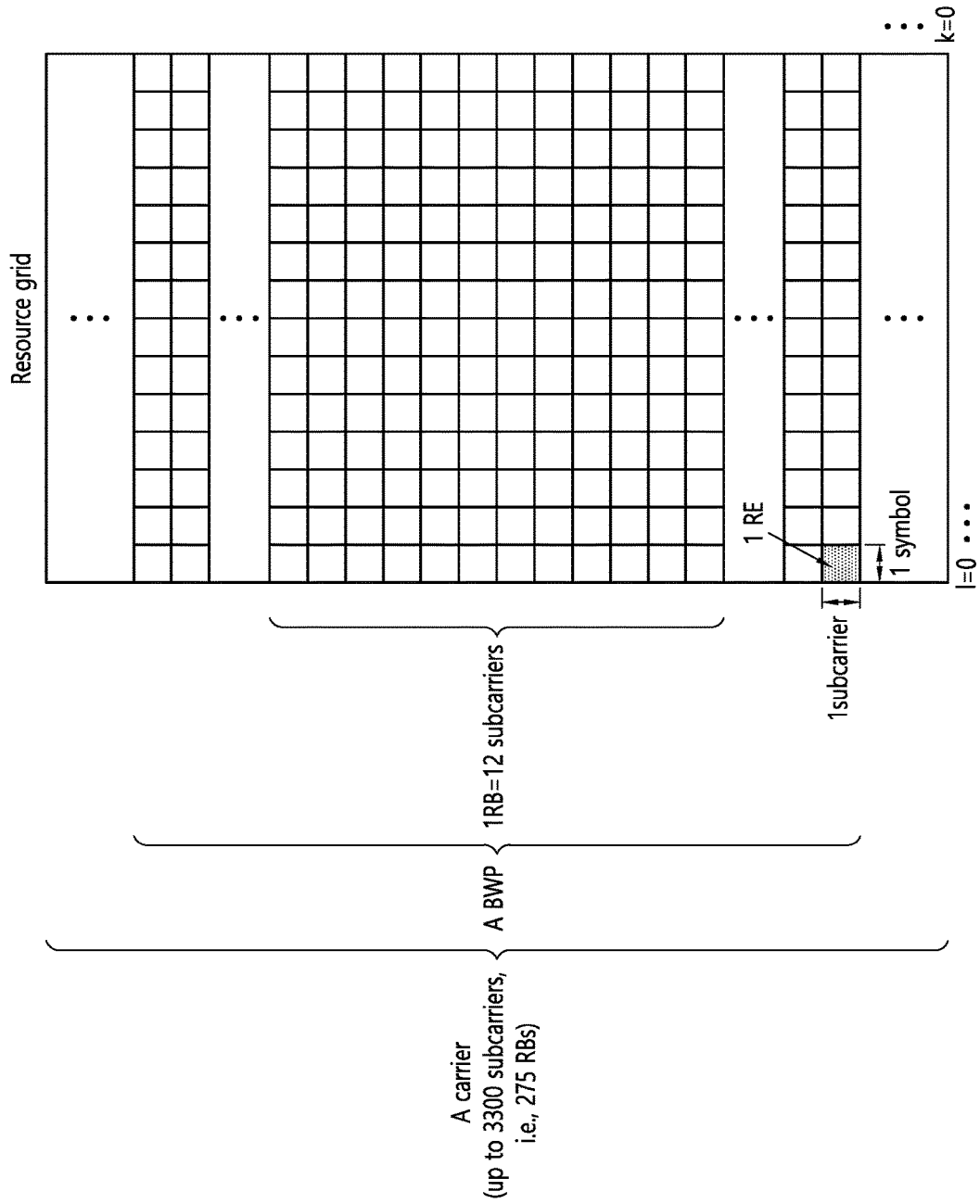
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
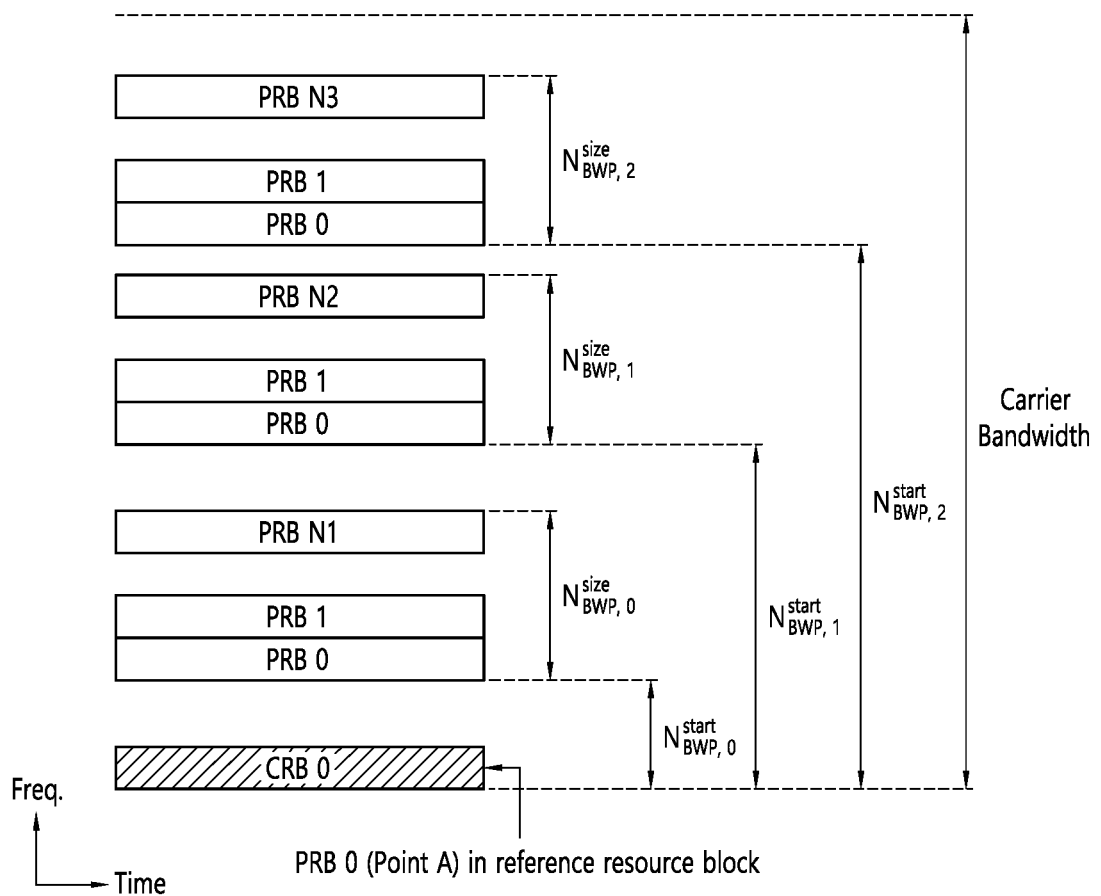
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
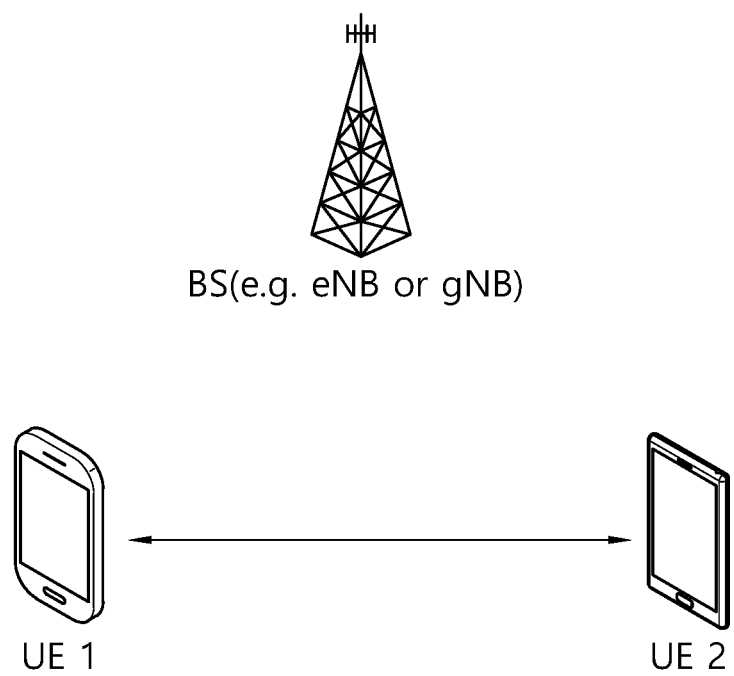
FIG. 7 shows a UE performing V2X or SL communication, based on an embodiment of the present disclosure.

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
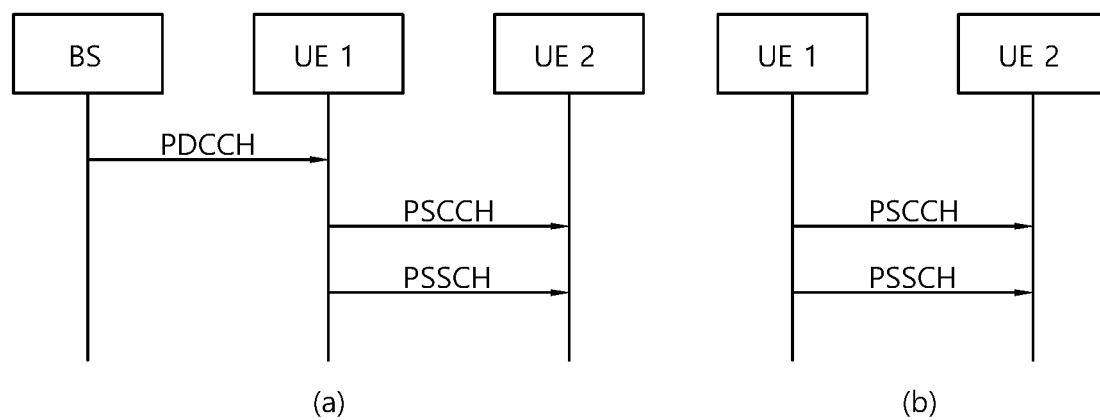
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 9:
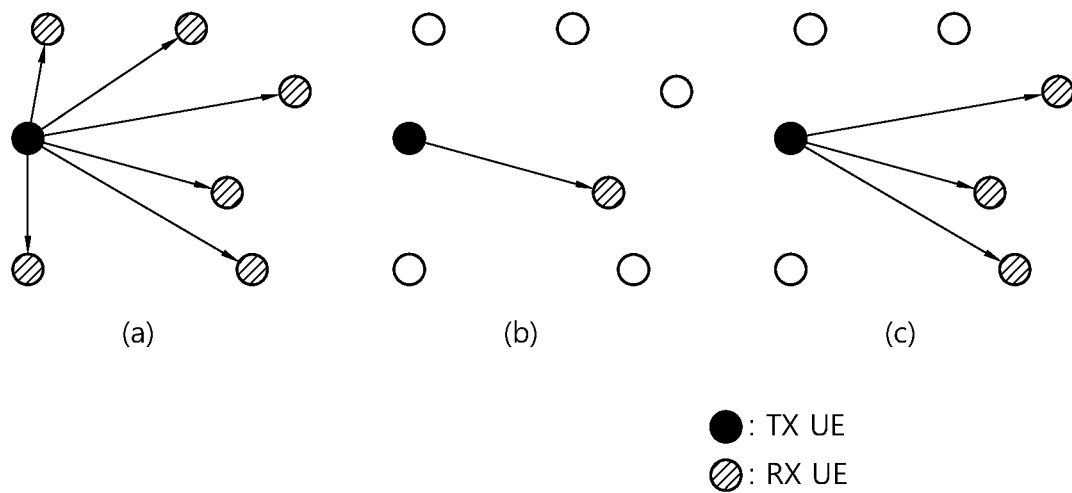
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 10:
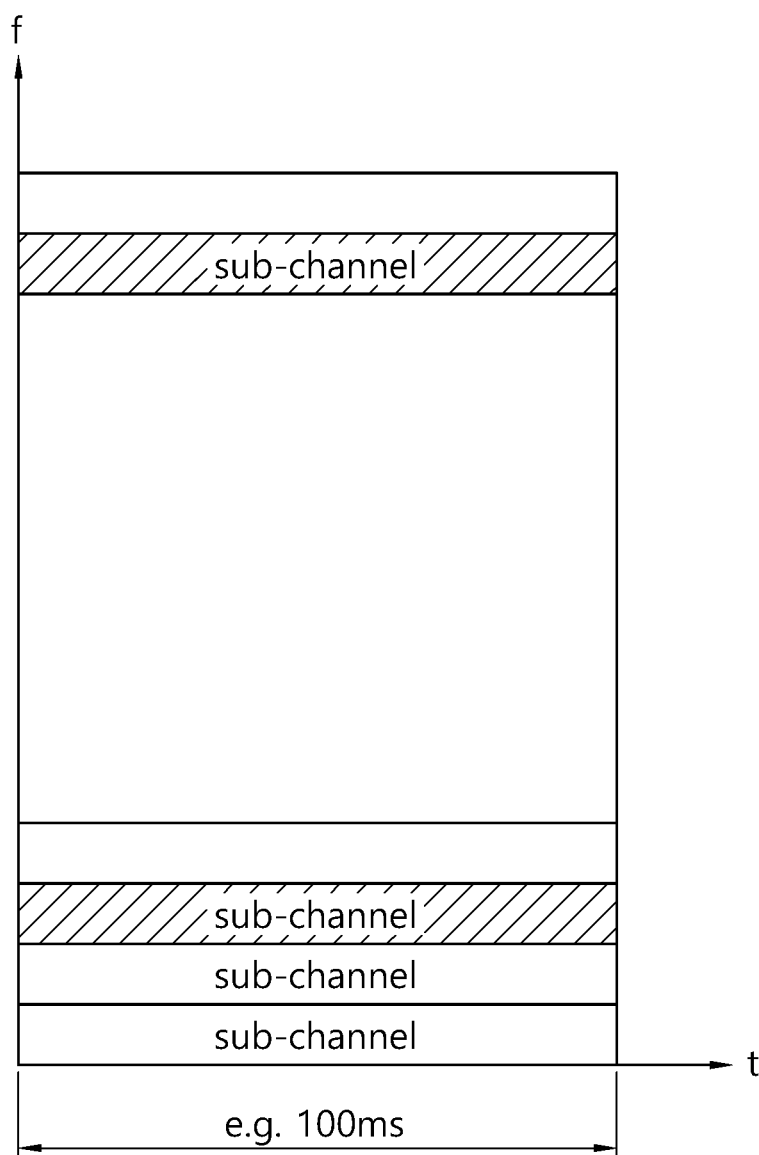
FIG. 10 shows a resource unit for CBR measurement, based on an embodiment of the present disclosure.

FIG. 10 shows a resource unit for CBR measurement, based on an embodiment of the present disclosure. The embodiment of FIG. 10 may be combined with various embodiments of the present disclosure.

Referring to FIG. 10, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 10, if it is assumed that a hatched sub-channel is a sub-channel having a value greater than or equal to a pre-configured threshold, the CBR may denote a ratio of the hatched sub-channels for a period of 100 ms. Additionally, the CBR may be reported to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (Modulation and Coding Scheme (MCS) coordination), or the like.

Hereinafter, a hybrid automatic repeat request (HARQ) procedure will be described.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or Reference Signal Received Power (RSRP).

For example, in the groupcast option 1, in case of the TX-RX distance-based HARQ feedback, if the TX-RX distance is less than or equal to a communication range requirement, the receiving UE may transmit HARQ feedback for the PSSCH to the transmitting UE. Otherwise, if the TX-RX distance is greater than the communication range requirement, the receiving UE may not transmit the HARQ feedback for the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot #X to a slot #N, the receiving UE may transmit HARQ feedback for the PSSCH to the transmitting UE in a slot #(N+A). For example, the slot #(N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a sub-channel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Meanwhile, in the present disclosure, a transmitting UE (i.e., TX UE) may be a UE which transmits data to a (target) receiving UE (i.e., RX UE). For example, the TX UE may be a UE which performs PSCCH transmission and/or PSSCH transmission. For example, the TX UE may be a UE which transmits SL CSI-RS(s) and/or a SL CSI report request indicator to the (target) RX UE. For example, the TX UE may be a UE which transmits (pre-defined) reference signal(s) (e.g., PSSCH demodulation reference signal(s) (DM-RS(s))) and/or a SL (L1) RSRP report request indicator to be used for SL (L1) RSRP measurement to the (target) RX UE(s). For example, the TX UE may be a UE which transmits (control) channel(s) (e.g., PSCCH, PSSCH, etc.) and/or reference signal(s) (e.g., DM-RS(s), CSI-RS(s), etc.) on the (control) channel(s) to be used for a SL radio link monitoring (RLM) operation and/or a SL radio link failure (RLF) operation of the (target) RX UE.

Meanwhile, in the present disclosure, a receiving UE (i.e., RX UE) may be a UE which transmits SL HARQ feedback to a transmitting UE (i.e., TX UE) based on whether decoding of data received from the TX UE is successful and/or whether detection/decoding of a PSCCH (related to PSSCH scheduling) transmitted by the TX UE is successful. For example, the RX UE may be a UE which performs SL CSI transmission to the TX UE based on SL CSI-RS(s) and/or a SL CSI report request indicator received from the TX UE. For example, the RX UE may be a UE which transmits, to the TX UE, a SL (L1) RSRP measurement value measured based on (pre-defined) reference signal(s) and/or a SL (L1) RSRP report request indicator received from the TX UE. For example, the RX UE may be a UE which transmits data of the RX UE to the TX UE. For example, the RX UE may be a UE which performs a SL RLM operation and/or a SL RLF operation based on a (pre-configured) (control) channel and/or reference signal(s) on the (control) channel received from the TX UE.

Meanwhile, in the present disclosure, a TX UE may transmit the entirety or part of information described below to the RX UE through SCI(s). Herein, for example, the TX UE may transmit the entirety or part of the information described below to the RX UE through a first SCI and/or a second SCI.

PSSCH (and/or PSCCH) related resource allocation information (e.g., the location/number of time/frequency resources, resource reservation information (e.g., period))

SL CSI report request indicator or SL (L1) RSRP (and/or SL (L1) RSRQ and/or SL (L1) RSSI) report request indicator SL CSI transmission indicator (or SL (L1) RSRP (and/or SL (L1) RSRQ and/or SL (L1) RSSI) information transmission indicator)) (on a PSSCH)

Modulation and coding scheme (MCS) information

Transmit power information

L1 destination ID information and/or L1 source ID information

SL HARQ process ID information

New data indicator (NDI) information

Redundancy version (RV) information (Transmission traffic/packet related) QoS information (e.g., priority information)

SL CSI-RS transmission indicator or information on the number of antenna ports for (transmitted) SL CSI-RS Location information of the TX UE or location (or distance region) information of the target RX UE (for which SL HARQ feedback is requested)

Reference signal (e.g., DM-RS, etc.) information related to channel estimation and/or decoding of data to be transmitted through a PSSCH. For example, the reference signal information may be information related to a pattern of a (time-frequency) mapping resource of DM-RS, rank information, antenna port index information, information on the number of antenna ports, etc.

Meanwhile, in the present disclosure, for example, a PSCCH may be replaced/substituted with at least one of a SCI, a first SCI ($1^{st}$-stage SCI), and/or a second SCI ($2^{nd}$-stage SCI), or vice versa. For example, a SCI may be replaced/substituted with at least one of a PSCCH, a first SCI, and/or a second SCI, or vice versa. For example, a PSSCH may be replaced/substituted with a second SCI and/or a PSCCH, or vice versa.

Meanwhile, in the present disclosure, for example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the $1^{st}$ SCI and the $2^{nd}$ SCI may be transmitted through different channels. For example, the transmitting UE may transmit the first SCI to the receiving UE through the PSCCH. For example, the second SCI may be transmitted to the receiving UE through an (independent) PSCCH, or may be transmitted in a piggyback manner together with data through the PSSCH.

Meanwhile, in the present disclosure, for example, "configure/configured" or "define/defined" may refer to being (pre-)configured from a base station or a network. For example, "configure/configured" or "define/defined" may refer to being (pre-)configured for each resource pool from the base station or the network. For example, the base station or the network may transmit information related to "configuration" or "definition" to the UE. For example, the base station or the network may transmit information related to "configuration" or "definition" to the UE through pre-defined signaling. For example, the pre-defined signaling may include at least one of RRC signaling, MAC signaling, PHY signaling, and/or SIB.

Meanwhile, in the present disclosure, for example, "configure/configured" or "define/defined" may refer to being designated or configured through pre-configured signaling between UEs. For example, information related to "configuration" or "definition" may be transmitted or received pre-configured signaling between UEs. For example, the pre-defined signaling may include at least one of RRC signaling, MAC signaling, PHY signaling, and/or SIB.

Meanwhile, in the present disclosure, for example, RLF may be replaced/substituted with out-of-synch (OOS) and/or in-synch (IS), or vice versa.

Meanwhile, in the present disclosure, for example, a resource block (RB) may be replaced/substituted with a subcarrier, or vice versa. For example, a packet or a traffic may be replaced/substituted with a transport block (TB) or a medium access control protocol data unit (MAC PDU) according to a transmission layer, or vice versa. For example, a code block group (CBG) may be replaced/substituted with a TB, or vice versa. For example, a source ID may be replaced/substituted with a destination ID, or vice versa. For example, an L1 ID may be replaced/substituted with an L2 ID, or vice versa. For example, the L1 ID may be an L1 source ID or an L1 destination ID. For example, the L2 ID may be an L2 source ID or an L2 destination ID.

Meanwhile, in the present disclosure, for example, operation(s) of a TX UE to reserve/select/determine retransmission resource(s) may include operation(s) of the TX UE to reserve/select/determine potential retransmission resource(s) in which actual use is determined based on SL HARQ feedback information received from RX UE(s).

Meanwhile, in the present disclosure, a sub-selection window may be replaced/substituted with a selection window and/or a pre-configured number of resource sets within the selection window, or vice versa.

Meanwhile, in the present disclosure, SL MODE 1 may refer to a resource allocation method or a communication method in which a base station directly schedules SL transmission resource(s) for a TX UE through pre-defined signaling (e.g., DCI or RRC message). For example, SL MODE 2 may refer to a resource allocation method or a communication method in which a UE independently selects SL transmission resource(s) in a resource pool pre-configured or configured from a base station or a network. For example, a UE performing SL communication based on SL MODE 1 may be referred to as a MODE 1 UE or MODE 1 TX UE, and a UE performing SL communication based on SL MODE 2 may be referred to as a MODE 2 UE or MODE 2 TX UE.

Meanwhile, in the present disclosure, for example, a dynamic grant (DG) may be replaced/substituted with a configured grant (CG) and/or a semi-persistent scheduling (SPS) grant, or vice versa. For example, the DG may be replaced/substituted with a combination of the CG and the SPS grant, or vice versa. For example, the CG may include at least one of a configured grant (CG) type 1 and/or a configured grant (CG) type 2. For example, in the CG type 1, a grant may be provided by RRC signaling and may be stored as a configured grant. For example, in the CG type 2, a grant may be provided by a PDCCH, and may be stored or deleted as a configured grant based on L1 signaling indicating activation or deactivation of the grant. For example, in the CG type 1, a base station may allocate periodic resource(s) to a TX UE through an RRC message. For example, in the CG type 2, a base station may allocate periodic resource(s) to a TX UE through an RRC message, and the base station may dynamically activate or deactivate the periodic resource(s) through a DCI.

Meanwhile, in the present disclosure, a channel may be replaced/substituted with a signal, or vice versa. For example, transmission/reception of a channel may include transmission/reception of a signal. For example, transmission/reception of a signal may include transmission/reception of a channel. For example, cast may be replaced/substituted with at least one of unicast, groupcast, and/or broadcast, or vice versa. For example, a cast type may be replaced/substituted with at least one of unicast, groupcast, and/or broadcast, or vice versa. For example, the cast or the cast type may include unicast, groupcast and/or broadcast.

Meanwhile, in the present disclosure, a resource may be replaced/substituted with a slot or a symbol, or vice versa. For example, the resource may include a slot and/or a symbol.

Meanwhile, in the present disclosure, a priority may be replaced/substituted with at least one of logical channel prioritization (LCP), latency, reliability, minimum required communication range, prose per-packet priority (PPPP), sidelink radio bearer (SLRB), a QoS profile, a QoS parameter, and/or requirement, or vice versa.

Meanwhile, in the present disclosure, for example, for convenience of description, a (physical) channel used when a RX UE transmits at least one of the following information to a TX UE may be referred to as a PSFCH.

SL HARQ feedback, SL CSI, SL (L1) RSRP

Meanwhile, in the present disclosure, a high priority may mean a small priority value, and a low priority may mean a large priority value. For example, Table 5 shows an example of priorities.

TABLE 5

| service or logical channel | priority value |
| --- | --- |
| service A or logical channel A | 1 |
| service B or logical channel B | 2 |
| service C or logical channel C | 3 |

Referring to Table 5, for example, service A or logical channel A related to the smallest priority value may have the highest priority. For example, service C or logical channel C related to the largest priority value may have the lowest priority.

Hereinafter, UE procedure for determining the subset of resources to be reported to higher layers in PSSCH resource selection in sidelink resource allocation mode 2 will be described.

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;

L1 priority, $prio_{TX}$;

the remaining packet delay budget;

the number of sub-channels to be used for the PSSCH/PSCCH transmission in a slot, $L_{subCH}$;

optionally, the resource reservation interval, $P_{rsvp\_TX}$, in units of msec.

if the higher layer requests the UE to determine a subset of resources from which the higher layer will select resources for PSSCH/PSCCH transmission as part of re-evaluation or pre-emption procedure, the higher layer provides a set of resources ($r_0, r_1, r_2, \ldots$) which may be subject to re-evaluation and a set of resources ($r_0', r_1', r_2', \ldots$) which may be subject to pre-emption.

it is up to UE implementation to determine the subset of resources as requested by higher layers before or after the slot $r_i''-T_3$, where $r_i''$ is the slot with the smallest slot index among ($r_0, r_1, r_2, \ldots$) and ($r_0', r_1', r_2', \ldots$) and $T_3$ is equal to $T_{proc,1}^{SL}$, where $T_{proc,1}^{SL}$ is the number of slots determined based on the SCS configuration of the SL BWP.

The following higher layer parameters affect this procedure:

sl-SelectionWindowList: internal parameter $T_{2\ min}$ is set to the corresponding value from higher layer parameter sl-SelectionWindowList for the given value of $prio_{TX}$.

sl-Thres-RSRP-List: this higher layer parameter provides an RSRP threshold for each combination $(p_i, p_j)$, where $p_i$ is the value of the priority field in a received SCI format 1-A and $p_j$ is the priority of the transmission of the UE selecting resources; for a given invocation of this procedure, $p_j = prio_{TX}$.

sl-RS-ForSensing selects if the UE uses the PSSCH-RSRP or PSCCH-RSRP measurement.

sl-ResourceReservePeriodList sl-SensingWindow: internal parameter $T_0$ is defined as the number of slots corresponding to sl-SensingWindow msec sl-TxPercentageList: internal parameter X for a given $prio_{TX}$ is defined as sl-TxPercentageList $(prio_{TX})$ converted from percentage to ratio sl-PreemptionEnable: if sl-PreemptionEnable is provided, and if it is not equal to 'enabled', internal parameter $prio_{pre}$ is set to the higher layer provided parameter sl-PreemptionEnable The resource reservation interval, $P_{rsvp\_TX}$, if provided, is converted from units of msec to units of logical slots, resulting in $P'_{rsvp\_TX}$.

Notation:

$(t'^{SL}_0, t'^{SL}_1, t'^{SL}_2, \ldots)$ denotes the set of slots which belongs to the sidelink resource pool.

For example, the UE may select a set of candidate resources $(S_A)$ based on Table 6. For example, if resource (re)selection is triggered, the UE may select a set of candidate resources $(S_A)$ based on Table 6. For example, if re-evaluation or pre-emption is triggered, the UE may select a set of candidate resources $(S_A)$ based on Table 6.

TABLE 6

The following steps are used:

1) A candidate single-slot resource for transmission $R_{x,\ y}$ is defined as a set of $L_{subCH}$ contiguous sub-channels with sub-channel $x + j$ in slot $t'^{SL}_y$ where $j = 0, \ldots, L_{subCH} - 1$. The UE shall assume that any set of $L_{subCH}$ contiguous sub-channels included in the corresponding resource pool within the time interval $[n + T_1, n + T_2]$ correspond to one candidate single-slot resource, where
selection of $T_1$ is up to UE implementation under $0 \leq T_1 \leq T_{proc,\ 1}^{SL}$, where $T_{proc,\ 1}^{SL}$
is defined in slots in Table 8.1.4-2 where $\mu_{SL}$ is the SCS configuration of the SL BWP;
if $T_{2\ min}$ is shorter than the remaining packet delay budget (in slots) then $T_2$ is up to UE implementation subject to $T_{2\ min} \leq T_2 \leq$ remaining packet delay budget (in slots);
otherwise $T_2$ is set to the remaining packet delay budget (in slots).
The total number of candidate single-slot resources is denoted by $M_{total}$.
2) The sensing window is defined by the range of slots $[n - T_0, n - T_{proc,\ 0}^{SL})$ where $T_0$ is defined above and $T_{proc,\ 0}^{SL}$ is defined in slots in Table 8.1.4-1 where $\mu_{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.
3) The internal parameter $Th(p_i, p_j)$ is set to the corresponding value of RSRP threshold indicated by the i-th field in sl-Thres-RSRP-List, where $i = p_i + (p_j - 1) * 8$.
4) The set $S_A$ is initialized to the set of all the candidate single-slot resources.
5) The UE shall exclude any candidate single-slot resource $R_{x,\ y}$ from the set $S_A$ if it meets all the following conditions:
the UE has not monitored slot $t'^{SL}_m$ in Step 2.
for any periodicity value allowed by the higher layer parameter sl-ResourceReservePeriodList and a hypothetical SCI format 1-A received in slot $t'^{SL}_m$ with 'Resource reservation period' field set to that periodicity value and indicating all subchannels of the resource pool in this slot, condition c in step 6 would be met.
5a) If the number of candidate single-slot resources $R_{x,\ y}$ remaining in the set $S_A$ is smaller than $X \cdot M_{total}$, the set $S_A$ is initialized to the set of all the candidate single-slot resources as in step 4.
6) The UE shall exclude any candidate single-slot resource $R_{x,\ y}$ from the set $S_A$ if it meets all the following conditions:
a) the UE receives an SCI format 1-A in slot $t'^{SL}_m$, and 'Resource reservation period' field, if present, and 'Priority' field in the received SCI format 1-A indicate the values $P_{rsvp\_RX}$ and $prio_{RX}$, respectively;
b) the RSRP measurement performed, for the received SCI format 1-A, is higher than $Th(prio_{RX}, prio_{TX})$;
c) the SCI format received in slot $t'^{SL}_m$ the same SCI format which, if and only if the 'Resource reservation period' field is present in the received SCI format 1-A, is assumed to be received in slot(s)

$t'^{SL}_{m+q \times P'_{rsvp\_RX}}$ determines the set of resource blocks and slots which overlaps with $R_{x, y+j \times P'_{rsvp\_TX}}$ for $q = 1, 2, \ldots, Q$ and $j = 0, 1, \ldots, C_{resel} - 1$. Here, $P'_{rsvp\_RX}$ is $P_{rsvp\_RX}$ converted to units of logical slots, $$Q = \left\lceil \frac{T_{scal}}{P_{rsvp\_RX}} \right\rceil$$

TABLE 6-continued if $P_{rsvp\_RX} < T_{scal}$ and n' − m ≤ $P'_{rsvp\_RX}$, where $t'_n{}^{SL}$ = n if slot n belongs to the set
($t'_0{}^{SL}, t'_1{}^{SL}, \ldots, t'_{T_{max}-1}{}^{SL}$), otherwise slot $t'_n{}^{SL}$ is the first slot after slot n belonging to the
set ($t'_0{}^{SL}, t'_1{}^{SL}, \ldots, t'_{T_{max}-1}{}^{SL}$); otherwise Q = 1. $T_{scal}$ is set to selection window size $T_2$
converted to units of msec.
7) If the number of candidate single-slot resources remaining in the set $S_A$ is smaller than
X · $M_{total}$, then Th($p_i, p_j$) is increased by 3 dB for each priority value Th($p_i, p_j$) and the
procedure continues with step 4.
The UE shall report set $S_A$ to higher layers.
If a resource $r_i$ from the set ($r_0, r_1, r_2, \ldots$) is not a member of $S_A$, then the UE shall report re-
evaluation of the resource $r_i$ to higher layers.
If a resource $r'_i$ from the set ($r'_0, r'_1, r'_2, \ldots$) meets the conditions below then the UE shall report
pre-emption of the resource $r'_i$ to higher layers
$r'_i$ is not a member of $S_A$, and
$r'_i$ meets the conditions for exclusion in step 6, with Th($prio_{RX}, prio_{TX}$) set to the final
threshold after executing steps 1)-7), i.e. including all necessary increments for reaching
X · $M_{total}$ and
the associated priority $prio_{RX}$, satisfies one of the following conditions:
sl-PreemptionEnable is provided and is equal to 'enabled' and $prio_{TX} > prio_{RX}$
sl-PreemptionEnable is provided and is not equal to 'enabled', and $prio_{RX} < prio_{pre}$
and $prio_{TX} > prio_{RX}$ Meanwhile, for power saving of the UE, partial sensing may be supported. For example, partial sensing may be periodic-based partial sensing (PBPS) or contiguous partial sensing (CPS).

Meanwhile, there may be a case in which the P-UE performing partial sensing is not guaranteed the minimum number of slots required for sensing. Specifically, for example, the P-UE shall determine the end time of the selection window in consideration of the packet delay budget (PDB), and the P-UE shall select Y candidate slots more than a minimum number within the selection window. In this case, if the PDB is tight or the number of Y candidate slots is large, the P-UE may not be guaranteed the minimum number of slots required for sensing. Therefore, when the P-UE is not guaranteed the minimum number of slots required for sensing, a method for resource selection of the P-UE needs to be defined.

For example, the UE (P-UE) performing a power saving operation (and/or SL DRX operation) may be configured to perform at least one of re-evaluation procedure, pre-emption procedure, sensing operation, partial sensing operation and/or P-UE related mode 1/2 (resource allocation/selection) operation, according to the following (some) rules. Here, for example, the following (some) rules may be configured to be (limitedly) applied only when a periodic resource reservation operation is permitted/configured on the resource pool. For example, the following (some) rules may be configured to be (limitedly) applied only when an aperiodic resource reservation operation is allowed/configured on the resource pool. For example, the following (some) rules may be configured to be (limitedly) applied only when the periodic resource reservation operation is not allowed/configured on the resource pool. For example, the following (some) rules may be configured to be (limitedly) applied only when the aperiodic resource reservation operation is not allowed/configured on the resource pool. For example, the following (some) rules may be configured to be (limitedly) applied only when a (LCH or service-related) packet having a priority higher than or equal to a pre-configured threshold level is transmitted. For example, the following (some) rules may be configured to be (limitedly) applied only when a (LCH or service-related) packet having a priority less than or equal to a pre-configured threshold level is transmitted. For example, the following (some) rules may be configured to be (limitedly) applied only when packets related to QoS requirements (for example, latency, reliability, minimum communication range) higher than or equal to a pre-configured threshold are transmitted. For example, the following (some) rules may be configured to be (limitedly) applied only when packets related to QoS requirements (for example, latency, reliability, minimum communication range) below than or equal to a pre-configured threshold are transmitted. For example, the following (some) rules may be configured to be (limitedly) applied only when a congestion level (for example, CBR) in the resource pool is higher than a pre-configured threshold. For example, the following (some) rules may be configured to be (limitedly) applied only when a congestion level (for example, CBR) in the resource pool is lower than a pre-configured threshold.

According to an embodiment of the present disclosure, when the P-UE performs a re-evaluation operation on a selection resource (before being signaled by SCI (determined internally by the terminal)) and/or a preemption check operation on a selection/reservation resource (signaled by SCI), the P-UE may be configured to determine a candidate (transmission) resource (set) in which re-evaluation-based reselection for a selection resource and/or pre-emption-based reselection for a selection/reservation resource can be performed, by using a sensing result required to perform a re-evaluation operation and/or a sensing result required to perform a preemption check operation (for example, ST_SENRST) and a result of partial sensing (for example, PT_SENRST) performed within a sensing window of a pre-configured length/size (for example, LT_SENWIN) ((before transmission resource (re) selection is triggered and/or before data (to be transmitted) on the buffer (and/or LCH) is available)), together. For example, when the P-UE performs a re-evaluation operation for a selection resource (before signaled by SCI (terminal internally determined)) and/or a preemption check operation for a selection/reservation resource (signaled by SCI), the P-UE may be configured to determine, by using both ST_SENRST and PT_SENRST, whether the re-evaluation-based reselection for selection resources and/or the preemption-based reselection for selection/reservation resources is required.

For example, when using the PT_SENRST result, the P-UE may assume that the corresponding (PSCCH/PSSCH) transmission is performed even on a time point (for example, slot #(N+P_VAL)) separated by one resource reservation period (for example, P_VAL) from the time of receiving/decoding the related SCI (for example, slot #N). For example, when using the PT_SENRST result, the P-UE may assume that the corresponding (PSCCH/PSSCH) transmission is performed even on a time point of P_VAL-based pre-configured numbers (for example, K_VAL) (for example, slot #(N+P_VAL), slot #(N+P_VAL*2), . . . , slot #(N+P_VAL*(K_VAL-2)), slot #(N+P_VAL*(K_VAL-1))) from the time of receiving/decoding the related SCI (for example, slot #N). For example, when using the PT_SENRST result, the P-UE may assume that the corresponding (PSCCH/PSSCH) transmission is performed even on a time point of P_VAL-based infinite numbers from the time of receiving/decoding the related SCI (for example, slot #N). For example, when using the PT_SENRST result, the P-UE may assume that the corresponding (PSCCH/PSSCH) transmission is performed even on a time point of (future) time signaled by the (corresponding) SCI from the time of receiving/decoding the related SCI (for example, slot #N). Based on the above assumptions, the P-UE may be configured to determine a candidate (transmission) resource (set) in which re-evaluation-based reselection for a selection resource and/or preemption-based reselection for a selection/reservation resource can be performed. Based on the above-mentioned assumption, the P-UE may be configured to determine whether the re-evaluation-based reselection for the selection resource and/or the preemption-based reselection for the selection/reservation resource is required.

For example, the P-UE may be configured to perform sensing required to perform a re-evaluation operation and/or sensing required to perform a preemption check operation (for example, ST_SENOPT), within a (time) window (consisting of consecutive slots) of (independently) pre-configured length/size, (before signaled by SCI (determined internally by the terminal)) prior to selection resource and/or selection/reservation resource (signaled by SCI). For example, the P-UE may be configured to perform ST_SENOPT, within a (time) window (consisting of consecutive slots) of (independently) pre-configured length/size, (before signaled by SCI (terminal internally determined)) prior to a pre-configured offset value from a selection resource and/or selection/reservation resource (signaled by SCI). For example, the P-UE may be configured to perform ST_SENOPT in a (pre)configured pattern form within a (time) window of a pre-configured length/size. For example, the P-UE may be configured to perform ST_SENOPT in a (pre)configured pattern form, within a (time) window of a pre-configured length/size, (before signaled by SCI (determined internally in the terminal)) prior to selection resource and/or selection/reservation resource (signaled by SCI). For example, the P-UE may be configured to perform ST_SENOPT in a (pre)configured pattern form, within a (time) window of a pre-configured length/size, (before signaled by SCI (terminal internally determined)) prior to a pre-configured offset value from a selection resource and/or selection/reservation resource (signaled by SCI). Here, for example, the (maximum or minimum or average) length/size of the (time) window in which ST_SENOPT is performed may be configured to be relatively shorter than the (maximum or minimum or average) LT_SENWIN value related to partial sensing. For example, the (maximum or minimum or average) length/size of the (time) window in which ST_SENOPT is performed may be configured relatively longer than the (maximum or minimum or average) LT_SENWIN value related to partial sensing.

For example, in the case of performing ST_SENOPT, the P-UE may not be able to perform sensing on the relevant sensing request time (for example, slot #M) (due to ((NR or LTE) SL and/or UL) transmit operation). In this case, the P-UE may assume that PSCCH/PSSCH transmission by another UE is performed based on the (all or some pre-configured) candidate resource reservation period values (exceptionally) allowed in the resource pool on slot #M. For example, when performing reselection based on reevaluation and/or reselection based on preemption, the (all) resources (in the selection window) on the slot in which it is present may be in the form of excluded (and/or non-selectable). And, the P-UE may be configured to determine a candidate (transmission) resource (set) in which re-evaluation-based reselection and/or preemption-based reselection can be performed. Here, for example, such an operation/rule may be configured not to be (exceptionally) applied when determining a selectable candidate (transmission) resource (set) based on partial sensing.

According to an embodiment of the present disclosure, the P-UE may perform a sensing operation (after) from a time when resource selection is triggered (and/or when SL data (to be transmitted) is available on the LCH (and/or (L2) buffer)) (for example, slot #N). For example, the P-UE may be configured to not perform a sensing operation in excess of a pre-configured maximum sensing length. For example, the P-UE may be configured to (essentially) perform a sensing operation of a pre-configured minimum sensing length. For example, the P-UE may be configured to perform a sensing operation of a pre-configured minimum sensing length even by shifting the start position of the selection window. In the above case, after completing transmission resource selection and/or transmission information processing (for example, slot #K (for example, K>N)), if the time before the pre-configured sensing length (for example, slot #X), from the time before the pre-configured offset value from the (first) selected transmission resource (for example, slot #(Y-OFFVAL1-OFFVAL2), is later (in time) than slot #(K+1) (and/or slot #(N+OFFVAL2+1)), the P-UE may be configured not to perform a sensing operation during a time period from slot #(K+1) (and/or slot #(N+OFFVAL2+1)) to slot #(X-1) (for example, OFFVAL1 is the (minimum) time required for processing the sensing measurement/result value, and OFFVAL2 is the (minimum) time required for resource selection based on the sensing information and/or processing for transmission information)). Here, for example, the time interval in which the sensing operation related to re-evaluation and/or preemption for the selected transmission resource on slot #Y is performed (additionally) may be from slot #X to slot #(Y-OFFVAL1-OFFVAL2). In addition, for example, a sensing result obtained during a time period from slot #N to slot #K (and/or slot #(N+OFFVAL2)) may be interpreted as being used for the selection of a transmission resource on slot #Y For example, for re-evaluation and/or preemption check for the selected transmission resource on slot #Y, it can be interpreted that the sensing result obtained during the time period from slot #X to slot #(Y-OFFVAL1-OFFVAL2) and the sensing result obtained during the time period from slot #N to slot #K (and/or slot #(N+OFFVAL2)) are used together. Here, for example, when the above rule is applied, the time interval from slot #N to slot #K (and/or slot #(N+OFFVAL2)) may be interpreted as the (minimum) length/size in which the sensing operation must be performed.

For example, the P-UE may perform a sensing operation from (after) the time when resource selection is triggered (for example, slot #N) (and/or when SL data (to be transmitted) on the LCH (and/or (L2) buffer) is available), the P-UE may be configured to perform the sensing operation only a time before the pre-configured offset value from the last selected transmission resource (for example, slot #(Y-

OFFVAL1-OFFVAL2)). Here, for example, such a sensing result value may be interpreted as being used for (initial) transmission resource selection. For example, such a sensing result value may be interpreted as being used for re-evaluation and/or preemption check for the selected transmission resource.

For example, the P-UE may be configured to perform a sensing operation only from the time when the transmission resource selection is completed (for example, slot #(K+1)) to the time before the pre-configured offset value from the last selected transmission resource (for example, slot #(Y-OFFVAL1-OFFVAL2)), after the time when the resource selection is triggered (for example, slot #N) (and/or when SL data (to be transmitted) on the LCH (and/or (L2) buffer) is available). Here, for example, such a sensing result value may be interpreted as being used for re-evaluation and/or preemption check for the selected transmission resource. In addition, for example, the (initial) selected transmission resource may be interpreted as determined through random resource selection.

For example, the P-UE may perform a sensing operation after a time point at which transmission resource selection is completed (for example, slot #(K+1)), after a time point at which resource selection is triggered (for example, slot #N) (and/or when SL data (to be transmitted) on the LCH (and/or (L2) buffer) is available) (for example, the P-UE may be configured to not perform a sensing operation in excess of a pre-configured maximum sensing length, and/or the P-UE may be configured to (have to) perform a sensing operation of a pre-configured minimum sensing length (even by shifting the starting position of the selection window)). In this case, if the time before the pre-configured sensing length (for example, slot #X), from the time before the pre-configured offset value from the (first) selected transmission resource (for example, slot #(Y-OFFVAL1-OFFVAL2)), is later (in time) than slot #(K+1) (and/or slot #(N+OFFVAL2+1)), the P-UE may be configured not to perform a sensing operation during a time interval from slot #(K+1) (and/or slot #(N+OFFVAL2+1)) to slot #(X-1). Here, for example, the time interval when the sensing operation related to re-evaluation and/or preemption for the selected transmission resource on slot #Y is (additionally) performed may be from slot #X to slot #(Y-OFFVAL1-OFFVAL2). In addition, for example, the (initial) selected transmission resource on slot #Y may be interpreted as determined through random resource selection.

For example, the P-UE may perform a sensing operation of a pre-configured length/size (for example, L_SENS) from (after) a time point at which resource selection is triggered (for example, slot #N) (and/or when SL data (to be transmitted) on the LCH (and/or (L2) buffer) is available). For example, the starting point of the selection window may not appear until the sensing operation of the corresponding length/size is terminated (for example, slot #(N+L_SENS)), and/or the starting point of the selection window may be shifted (on the time domain). For example, after the P-UE performs the sensing operation of L_SENS, P-UE may perform transmission resource selection based on the corresponding sensing result information, within the selection window (for example, F_SWIN) from slot #(N+L_SENS+OFFVAL1+OFFVAL2) (for example, OFFVAL1 is the (minimum) time required for processing of sensing measurement/result value, and OFFVAL2 is the (minimum) time required for resource selection and/or processing of transmission information based on the sensing information) to slot #(N+L_SENS+OFFVAL1+OFFVAL2+PDB_VAL) (for example, PDB_VAL means a value less than or equal to the remaining latency budget of the (transmitted) packet). Here, for example, if the F_SWIN size/length is less than the interval between slot #(N+L_SENS+OFFVAL1+OFFVAL2) and slot #(N+L_SENS+OFFVAL1+OFFVAL2+T_MIN) (for example, T_MIN is the (selection window size/length) minimum value configured for each priority (related to transport packets)), and/or if the F_SWIN size/length is less than the pre-configured (minimum) threshold (per priority (of transport packet) and/or CBR (in resource pool)), the P-UE may be configured not to apply the sensing operation rule of the L_SENS length/size from (after) slot #N (described above). Accordingly, the P-UE may perform a sensing operation of a length/size less than the pre-configured length/size (for example, L_SENS). That is, the number of slots for sensing of the pre-configured length/size may not be guaranteed. In this case, for example, the P-UE may perform (initial) transmission resource selection based on random resource selection, and/or may fall back to a method for performing pre-configured sensing. Specifically, for example, according to a method for performing pre-configured sensing, the P-UE may perform a sensing operation (of the pre-configured length and/or pattern) from a time point when resource selection is triggered (and/or when SL data (to be transmitted) on the LCH (and/or (L2) buffer) is available). Hereinafter, the above-described operation of the P-UE will be described in detail with reference to FIGS. 11 and 12.

Figure 11:
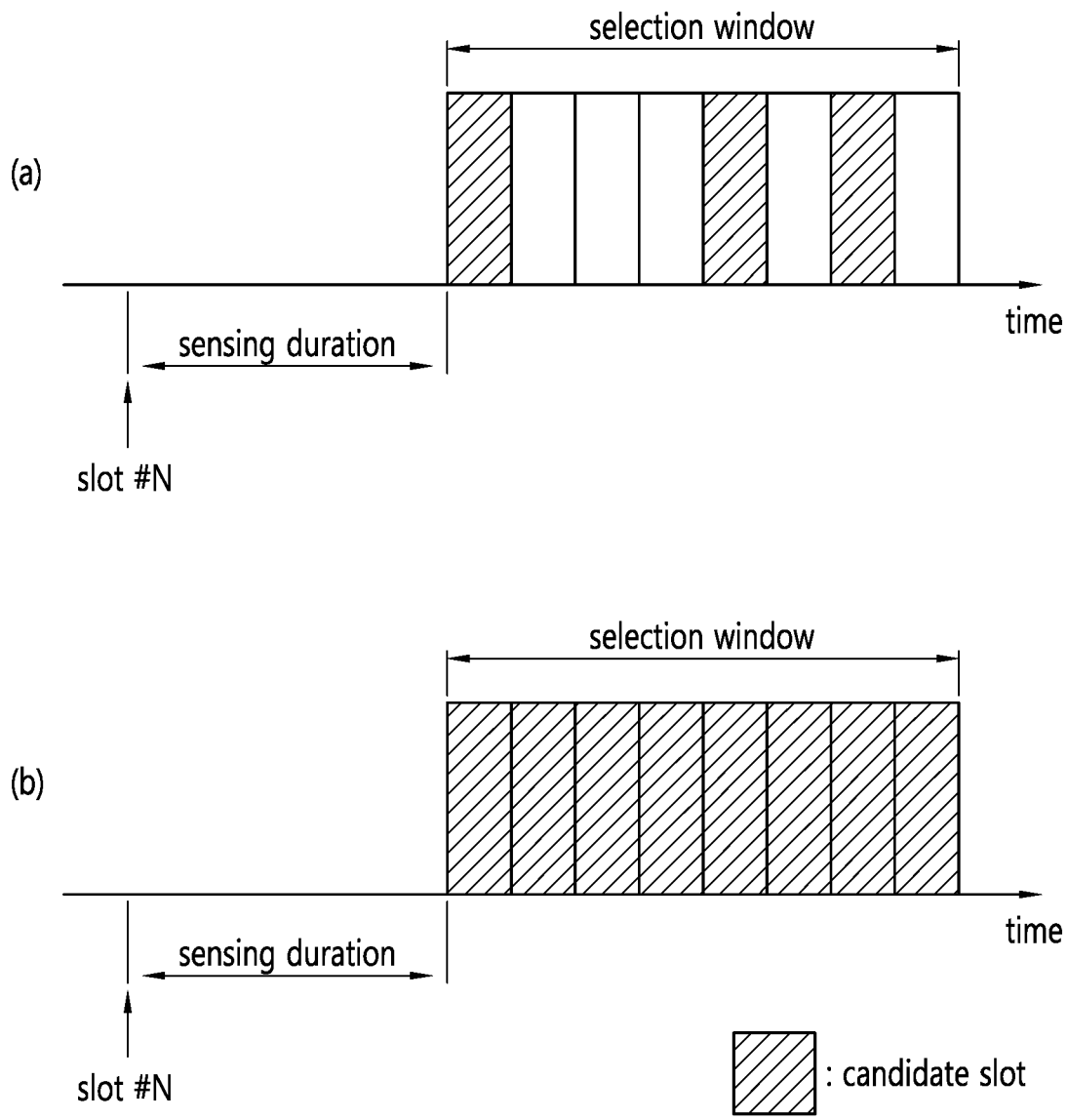
FIG. 11 illustrates a method for a UE to perform partial sensing according to an embodiment of the present disclosure.

FIG. 11 illustrates a method for a UE to perform partial sensing according to an embodiment of the present disclosure. The embodiment of FIG. 11 may be combined with various embodiments of the present disclosure.

Referring to (a) of FIG. 11, the UE may trigger resource (re)selection at slot #N. In the embodiment of (a) of FIG. 11, it is assumed that the minimum number of candidate slots to be selected within the selection window (that is, the selection window size) is 3. In this case, the UE may select at least three candidate slots within the selection window. In the embodiment of (a) of FIG. 11, it is assumed that the UE selects three candidate slots within the selection window. In this case, the UE may perform sensing after slot #N, and between the first of the three candidate slots, the UE may select/determine a set of candidate resources in the candidate slot based on the sensing result. In the embodiment of (a) of FIG. 11, the sensing operation of the pre-configured length/size (for example, L_SENS) may be guaranteed.

On the other hand, referring to (b) of FIG. 11, the UE may trigger resource (re)selection in slot #N. In the embodiment of (b) of FIG. 11, it is assumed that the minimum number of candidate slots to be selected in the selection window (that is, the selection window size) is 9. In this case, the UE may not be able to select 9 candidate slots within the selection window due to the size of the selection window limited by the PDB. In this case, according to an embodiment of the present disclosure described above, a sensing operation execution rule of the pre-configured length/size (for example, L_SENS) may not be applied from (after) slot #N. Accordingly, the sensing operation of the pre-configured length/size (for example, L_SENS) may not be guaranteed. In this case, the UE may perform a sensing operation as in the embodiment of FIG. 12.

Figure 12:
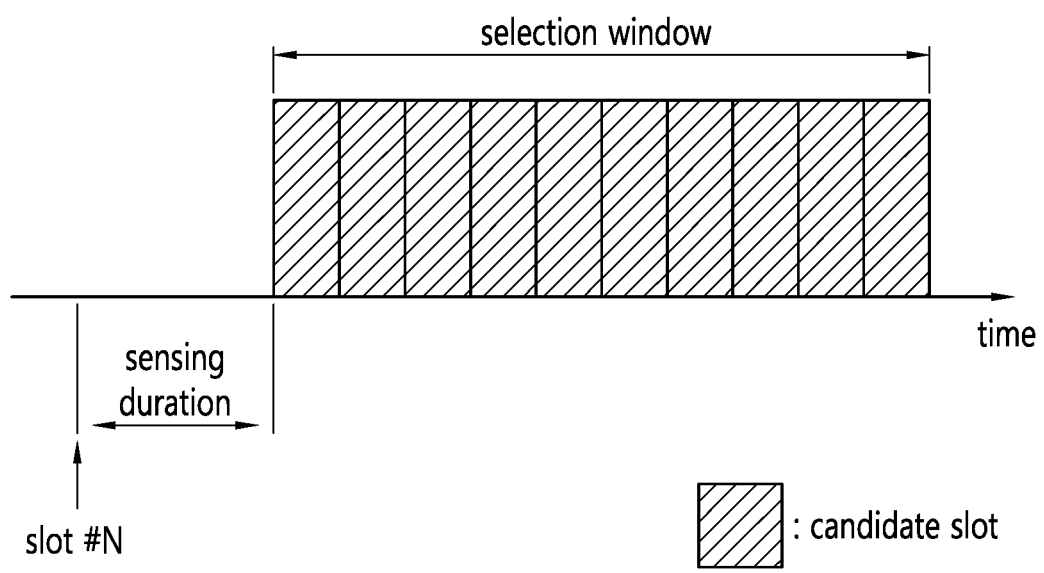
FIG. 12 illustrates a method for a UE to perform partial sensing according to an embodiment of the present disclosure.

FIG. 12 illustrates a method for a UE to perform partial sensing according to an embodiment of the present disclosure. The embodiment of FIG. 12 may be combined with various embodiments of the present disclosure.

Referring to FIG. 12, the UE may trigger resource (re) selection in slot #N. In the embodiment of FIG. 12, because of the minimum number of candidate slots that must be selected within the selection window (that is, the selection window size), a sensing operation of the pre-configured length/size (for example, L_SENS) may not be guaranteed. In this case, the UE may perform random selection-based resource selection or may continue to perform a sensing procedure based on the sensing result performed in a period smaller than the pre-configured length/size (for example, L_SENS).

Additionally, for example, the sensing operation (described above) of L_SENS length/size from (after) slot #N may be limitedly applied only to transmit (service) packets having (remaining) latency budget requirements greater than or equal to (or less than or equal to) a pre-configured threshold. For example, the sensing operation (described above) of L_SENS length/size from (after) slot #N may be limitedly applied only to transmit (service) packets having (remaining) latency budget requirements below than or equal to a pre-configured threshold.

For example, the sensing operation (described above) of L_SENS length/size from (after) slot #N may be limitedly applied only to the case of transmitting (service) packets having a reliability requirement greater than or equal to a pre-configured threshold. For example, the sensing operation (described above) of L_SENS length/size from (after) slot #N may be limitedly applied only to the case of transmitting (service) packets having a reliability requirement less than or equal to a pre-configured threshold. For example, the sensing operation (described above) of L_SENS length/size from (after) slot #N may be limitedly applied only to the case of transmitting the SL HARQ feedback DISABLED packet (for example, a MAC PDU). For example, the sensing operation (described above) of L_SENS length/size from (after) slot #N may be limitedly applied only to the case of transmitting the SL HARQ feedback ENABLED packet (for example, a MAC PDU). For example, the sensing operation (described above) of L_SENS length/size from (after) slot #N may be limitedly applied only when retransmission is performed less than or equal to a pre-configured threshold number. For example, the sensing operation (described above) of L_SENS length/size from (after) slot #N may be limitedly applied only when retransmission is performed more than or equal to a pre-configured threshold number. For example, the sensing operation (described above) of L_SENS length/size from (after) slot #N may be limitedly applied only to the case of transmitting a packet having a priority less than or equal to a pre-configured threshold level. For example, the sensing operation (described above) of L_SENS length/size from (after) slot #N may be limitedly applied only to the case of transmitting a packet having a priority higher than or equal to a pre-configured threshold level. For example, the sensing operation (described above) of L_SENS length/size from (after) slot #N may be limitedly applied only when the interference level (in the resource) is higher than or equal to a pre-configured threshold level. For example, the sensing operation (described above) of L_SENS length/size from (after) slot #N may be limitedly applied only when the interference level (in the resource) is less than or equal to a pre-configured threshold level.

For example, the (minimum or maximum) L_SENS value may be configured differently (or independently) for each service type. For example, the (minimum or maximum) L_SENS value may be configured differently (or independently) for each (LCH or service) priority. For example, the (minimum or maximum) L_SENS value may be configured differently (or independently) for each QoS requirement (for example, latency, reliability, minimum communication range). For example, the (minimum or maximum) L_SENS value may be configured differently (or independently) for each remaining delay budget/PDB value. For example, the (minimum or maximum) L_SENS value may be configured differently (or independently) for each PQI parameter. For example, the (minimum or maximum) L_SENS value may be configured differently (or independently) for each HARQ feedback ENABLED LCH/MAC PDU (transmission). For example, the (minimum or maximum) L_SENS value may be configured differently (or independently) for each HARQ feedback DISABLED LCH/MAC PDU (transmission). For example, the (minimum or maximum) L_SENS value may be configured differently (or independently) for each CBR measurement value in the resource pool.

According to an embodiment of the present disclosure, when partial (and/or full) sensing operation (and/or periodic resource reservation operation (and/or random resource selection operation)) is allowed/configured in the resource pool, only when the P-UE performs (actual) periodic resource reservation (and/or when the P-UE is interested in a service for which (service) packets are generated periodically), the P-UE may be configured to (restrictively) perform a partial sensing operation. For example, only when the P-UE transmits a packet with a priority smaller than or equal to a pre-configured threshold level, the P-UE may be configured to (exceptionally) periodically reserve/maintain a random selection-based transmission resource. For example, only when the P-UE transmits a packet with a priority higher than or equal to a pre-configured threshold level, the P-UE may be configured to (exceptionally) periodically reserve/maintain a random selection-based transmission resource. For example, only when the P-UE transmits (service) packets with (remaining) delay budget requirements greater than or equal to a pre-configured threshold, the P-UE may be configured to (exceptionally) periodically reserve/maintain a random selection-based transmission resource. For example, only when the P-UE transmits a (service) packet with a (remaining) delay budget requirement smaller than or equal to a pre-configured threshold, the P-UE may be configured to (exceptionally) periodically reserve/maintain a random selection-based transmission resource. For example, only when the P-UE transmits a (service) packet with a reliability requirement greater than or equal to a pre-configured threshold, the P-UE may be configured to (exceptionally) periodically reserve/maintain a random selection-based transmission resource. For example, only when the P-UE transmits a (service) packet with a reliability requirement smaller than or equal to a pre-configured threshold, the P-UE may be configured to (exceptionally) periodically reserve/maintain a random selection-based transmission resource. For example, only when the P-UE transmits an SL HARQ feedback DISABLED packet (for example, MAC PDU), the P-UE may be configured to (exceptionally) periodically reserve/maintain a random selection-based transmission resource. For example, only when the P-UE transmits an SL HARQ feedback ENABLED packet (for example, MAC PDU), the P-UE may be configured to (exceptionally) periodically reserve/maintain a random selection-based transmission resource. For example, only when the P-UE performs retransmissions less than or equal to a pre-configured threshold number, the P-UE may be configured to (exceptionally) periodically reserve/maintain a random selection-based transmission resource. For example, only when the P-UE performs retransmission more than or equal to a pre-configured threshold number of times, the P-UE may be configured to (exceptionally) periodically reserve/maintain a random selection-based transmission resource. For example, only when the interference level (for example, CBR) value in the resource pool is higher than or equal to a pre-configured threshold, the P-UE may be configured to (exceptionally) periodically reserve/maintain a random selection-based transmission resource. For example, only when the interference level (for example, CBR) value in the resource pool is lower than or equal to a pre-configured threshold, the P-UE may be configured to periodically reserve/maintain (exceptionally) a random selection-based transmission resource.

According to an embodiment of the present disclosure, based on mode 1 operation, resource allocation and packet transmission of the UE (vehicle and/or power saving (and/or performing SL DRX operation)) may be performed. In this case, when the UE transmits the PSCCH (and/or PSSCH) using the SL CG (Type 1 and/or Type 2) resource, the UE may designate the resource reservation period field value on the PSCCH (for example, 1ST SCI) as the SL CG (type 1 and/or type 2) related resource reservation period value (configured through RRC signaling (from the base station)). On the other hand, when the UE retransmits the PSCCH (and/or PSSCH) using the (retransmission) resource allocated through the SL DG (for example, DCI), the UE may designate the resource reservation period field value on the PSCCH (for example, 1ST SCI) as a pre-configured specific value (for example, 0). When the UE retransmits the PSCCH (and/or PSSCH) using the (retransmission) resource allocated through the SL DG (for example, DCI), the UE may designate the resource reservation period field value on the PSCCH (for example, 1ST SCI) as the SL CG (type 1 and/or type 2) related resource reservation period value (configured through RRC signaling (from the base station)). Here, for example, when retransmission for PSCCH (and/or PSSCH) is performed using (retransmission) resources allocated through SL DG (DCI), if the UE designates the resource reservation period field value on the PSCCH (for example, 1ST SCI) as an SL CG (type 1 and/or type 2) related resource reservation period value (for example, CG_PVAL), the UE may expect/determine that the base station schedules/allocates the location of different SL CG period related retransmission resources by maintaining the time interval of CG_PVAL.

For example, when resource allocation and packet transmission of the UE (vehicle and/or power saving (and/or performing SL DRX operation)) are performed based on mode 1 operation, the UE may expect/determine that the (time) interval (within a specific period) between the CG (Type 1 and/or Type 2) (last) resource and the retransmission-related DG (first) resource does not exceed a pre-configured threshold (for example, 32 slots). For example, when resource allocation and packet transmission of the UE (vehicle and/or power saving (and/or performing SL DRX operation)) are performed based on mode 1 operation, the UE may expect/determine that the (time) interval between the DG (last) resource (where initial transmission and/or retransmission has been performed) and the retransmission-related DG (first) resource does not exceed a pre-configured threshold (for example, 32 slots). In addition, for example, the proposed rule can be limitedly applied only when the target RX UE (and/or service type and/or LCH (SL data)) related to the transport packet is a power saving UE and/or a UE performing SL DRX operation. For example, the proposed rule can be limitedly applied only when the transport packet-related priority (and/or (L2) destination (and/or source) ID (pair)) is a pre-configured value (related to a power saving UE and/or a UE performing SL DRX operation). For example, the proposed rule may be limitedly applied only when a power saving UE and/or a UE performing SL DRX operation coexist on a (mode 1) resource pool. For example, the proposed rule may be limitedly applied only when resource selection based on random selection and/or partial sensing is allowed on the mode 1 resource pool. For example, the proposed rule may be limitedly applied only when the mode 1 resource pool overlaps (partly or all) with a resource pool for a power saving UE and/or a UE performing SL DRX operation. For example, the proposed rule may be limitedly applied only when the mode 1 resource pool overlaps (partly or all) a resource pool in which the partial sensing and/or the resource selection based on the random selection is allowed.

According to an embodiment of the present disclosure, the P-UE (performing the SL DRX operation) may expect/determine that (service type and/or (LCH or service) priority and/or QoS requirements and/or PQI parameters and/or (L2) destination (and/or source) ID (pair) specific) (UE common) SL DRX pattern and/or the parameter, configured by the base station (for example, SIB, RRC) in the in-coverage state, is the same as the (service type and/or (LCH or service) priority and/or QoS requirements and/or PQI parameters and/or (L2) destination (and/or source) ID (pair) specific) (UE common) SL DRX patterns and/or the parameters, pre-configured (by the network) in the out-of-coverage state. For example, the P-UE (performing the SL DRX operation) may expect/determine that (service type and/or (LCH or service) priority and/or QoS requirements and/or PQI parameters and/or (L2) destination (and/or source) ID (pair) specific) (UE common) the SL DRX patterns and/or parameters configured by the base station (for example, SIB, RRC) in an in-coverage state, are overlapped (some or all) with the (service type and/or (LCH or service) priority and/or QoS requirements and/or PQI parameters and/or (L2) destination (and/or source) ID (pair) specific) (UE common) SL DRX patterns and/or the parameters, pre-configured (by the network) in the out-of-coverage state, in terms of wake-up time and/or active time and/or on-duration. For example, the P-UE (performing the SL DRX operation) may expect/determine that the (service type and/or (LCH or service) priority and/or QoS requirements and/or PQI parameters and/or (L2) destination (and/or source) ID (pair) specific) (UE common) SL DRX patterns and/or parameters configured from different base stations (for example, SIB, RRC) are the same. For example, the P-UE (performing the SL DRX operation) may expect/determine that the (service type and/or (LCH or service) priority and/or QoS requirements and/or PQI parameters and/or (L2) destination (and/or source) ID (pair) specific) (UE common) SL DRX patterns and/or parameters configured by different base stations (for example, SIB, RRC) are overlapped (some or all) with each other, in terms of wake-up time and/or active time and/or on-duration.

According to an embodiment of the present disclosure, during SL DRX operation, before on-duration and/or active time (appeared periodically based on the SL DRX cycle), PSCCH ONLY monitoring resource area (for example, CTR_RSC) for acquiring sensing information (related/associated with PSSCH (and/or PSCCH) transmission within subsequent on-duration and/or active time) may be configured. Here, for example, when the corresponding rule is applied, even if the P-UE generates a transport packet (on (L2) buffer) after on-duration and/or active time start (and/or (transmitting) SL data available on LCH) (for example, slot #N), the P-UE may perform (related) transmission resource selection by using sensing information acquired in CTR_RSC and sensing information acquired in a time interval from a starting slot of on-duration and/or active time to a time before a pre-configured offset from slot #N (for example, slot #(N-OFFVAL1) (for example, OFFVAL1 means (minimum) time required for processing of sensing measurement/result value)) together. Here, for example, the proposed rule may be limitedly applied only to the case of transmitting a packet having a priority higher than a pre-configured threshold level. For example, the proposed rule may be limitedly applied only when a packet having a lower priority than a pre-configured threshold level is transmitted. For example, the proposed rule may be limitedly applied only when service-related communication having a higher priority than a pre-configured threshold level is performed. For example, the proposed rule may be limitedly applied only when service-related communication having a lower priority than a pre-configured threshold level is performed. For example, the proposed rule may be limitedly applied only when a packet having a (remaining) delay budget shorter than a pre-configured threshold is transmitted. For example, the proposed rule may be limitedly applied only when a packet having a (remaining) delay budget longer than a pre-configured threshold is transmitted. For example, the proposed rule may be limitedly applied only when service-related communication having a QoS requirement shorter than a pre-configured threshold is performed. For example, the proposed rule may be limitedly applied only when service-related communication having a QoS requirement longer than a pre-configured threshold is performed. For example, the proposed rule may be limitedly applied only when a packet having a reliability higher than a pre-configured threshold is transmitted. For example, the proposed rule may be limitedly applied only when a packet having a reliability lower than a pre-configured threshold is transmitted. For example, the proposed rule may be limitedly applied only when service-related communication having a QoS requirement higher than a pre-configured threshold is performed. For example, the proposed rule may be limitedly applied only when service-related communication having a QoS requirement lower than a pre-configured threshold is performed. For example, the proposed rule may be limitedly applied only to the case of transmitting the SL HARQ feedback DISABLED LCH/MAC PDU. For example, the proposed rule may be limitedly applied only to the case of transmitting the SL HARQ feedback ENABLED LCH/MAC PDU. For example, the proposed rule may be limitedly applied only when the interference level (for example, CBR) in the resource pool is higher than a pre-configured threshold. For example, the proposed rule may be limitedly applied only when the interference level (for example, CBR) in the resource pool is lower than a pre-configured threshold.

According to an embodiment of the present disclosure, when the following (some) conditions are satisfied, the P-UE may be configured to perform transmission resource selection over an on-duration and/or an (inactive time) domain other than the active time domain. For the convenience of description, the on-duration and/or active time region may be referred to as ACT_RG, and other (inactive time) regions may be referred to as OFF_RG.

Ex) When the interference level (for example, CBR) on ACT_RG is higher than the pre-configured threshold level Ex) When the interference level (for example, CBR) on ACT_RG is lower than the pre-configured threshold level Ex) When the interference level on OFF_RG is lower than the pre-configured threshold level Ex) When the interference level on OFF_RG is higher than the pre-configured threshold level Ex) When the (MAC PDU related) number of transmission resources is more than the pre-configured threshold Ex) When the (MAC PDU related) number of transmission resources is less than the pre-configured threshold Ex) When transmitting HARQ feedback ENABLED LCH/MAC PDU Ex) When transmitting HARQ feedback DISABLED LCH/MAC PDU Ex) When transmitting an LCH/MAC PDU with a lower priority than a pre-configured threshold level Ex) When transmitting an LCH/MAC PDU with a higher priority than a pre-configured threshold level Ex) When transmitting an LCH/MAC PDU of a pre-configured service type Ex) When transmitting an LCH/MAC PDU with a (remaining) delay budget (requirement) longer than a pre-configured threshold Ex) When transmitting an LCH/MAC PDU with a (remaining) delay budget (requirement) shorter than a pre-configured threshold Ex) When transmitting an LCH/MAC PDU with reliability (requirement) lower than the pre-configured threshold Ex) When transmitting an LCH/MAC PDU with reliability (requirement) higher than the pre-configured threshold Ex) When transmitting an LCH/MAC PDU with a pre-configured cast type (for example, unicast and/or groupcast and/or broadcast)

Here, for example, the ratio of the number of (MAC PDU related) transmission resources divided between ACT_RG and OFF_RG and/or the (minimum) number of transmission resources (that must be) included in the ACT_RG region and/or the (maximum) number of transmission resources (that must be) included in the OFF_RG region and/or the (maximum) number of transmission resources that can be included in the OFF_RG region may be configured differently (or independently) for each (related) service type. For example, the ratio of the number of transmission resources (related to MAC PDU) divided between ACT_RG and OFF_RG and/or the (minimum) number of transmission resources (that must be) included in the ACT_RG region and/or the (maximum) number of transmission resources (that must be) included in the OFF_RG region and/or the (maximum) number of transmission resources that can be included in the OFF_RG region may be configured differently (or independently) for each priority (LCH or service). For example, the ratio of the number of (MAC PDU related) transmission resources divided between ACT_RG and OFF_RG and/or the (minimum) number of transmission resources (that must be) included in the ACT_RG area and/or the (maximum) number of transmission resources (that must be) included in the OFF_RG area and/or the (maximum) number of transmission resources that can be included in the OFF_RG region may be configured differently (or independently) for each QoS requirement (for example, latency, reliability, minimum communication range). For example, the ratio of the number of (MAC PDU related) transmission resources divided between ACT_RG and OFF_RG and/or the (minimum) number of transmission resources (that must be) included in the ACT_RG area and/or the (maximum) number of transmission resources (that must be) included in the OFF_RG area and/or the (maximum) number of transmission resources that can be included in the OFF_RG region may be configured differently (or independently) for each PQI parameter. For example, the ratio of the number of transmission resources (related to MAC PDU) divided between ACT_RG and OFF_RG and/or the (minimum) number of transmission resources (that must be) included in the ACT_RG area and/or the (maximum) number of transmission resources (that must be) included in the OFF_RG region and/or the (maximum) number of transmission resources that can be included in the OFF_RG region may be configured differently (or independently) according to the amount of the (remaining) delay budget of the transport packet. For example, the ratio of the number of transmission resources (related to MAC PDU) divided between ACT_RG and OFF_RG and/or the (minimum) number of transmission resources (that must be) included in the ACT_RG area and/or the (maximum) number of transmission resources (that must be) included in the OFF_RG area and/or the (maximum) number of transmission resources that can be included in the OFF_RG region may be configured differently (or independently) for each HARQ feedback ENABLED LCH/MAC PDU (transmission). For example, the ratio of the number of transmission resources (related to MAC PDU) divided between ACT_RG and OFF_RG and/or the (minimum) number and/or the number of transmission resources (that must be) included in the ACT_RG area and/or the (maximum) number of transmission resources (that must be) included in the OFF_RG area and/or the (maximum) number of transmission resources that can be included in the OFF_RG region may be configured differently (or independently) for each HARQ feedback DISABLED LCH/MAC PDU (transmission). For example, the ratio of the number of transmission resources (related to MAC PDU) divided between ACT_RG and OFF_RG and/or the (minimum) number of transmission resources (that must be) included in the ACT_RG area and/or the (maximum) number of transmission resources (that must be) included in the OFF_RG area and/or the (maximum) number of transmission resources that can be included in the OFF_RG region may be configured differently (or independently) for each SL cast type (for example, unicast, groupcast, broadcast). For example, the ratio of the number of transmission resources (related to MAC PDU) divided between ACT_RG and OFF_RG and/or the (minimum) number of transmission resources (that must be) included in the ACT_RG area and/or the (maximum) number of transmission resources (that must be) included in the OFF_RG area and/or the (maximum) number of transmission resources that can be included in the OFF_RG region may be configured differently (or independently) for each SL groupcast HARQ feedback option (for example, NACK ONLY feedback, ACK/NACK feedback, NACK ONLY feedback based on TX-RX distance). For example, the P-UE may be configured to include initial transmission resources (related to a MAC PDU) in the ACT_RG region, and include retransmission resources (related to a MAC PDU) in the OFF_RG region.

Meanwhile, it may be difficult for the P-UE to accurately predict when the actual data (on LCH and/or on its own (L2) buffer) (to be transmitted) is available (even for a service in which packets are periodically generated (on the application layer)). For example, this is because the packet generation period can vary depending on several (environmental) factors. Therefore, it may be difficult for the P-UE to accurately determine the (actually necessary) timing of a partial sensing operation (and/or additional sensing operation timing (and/or additional sensing operation timing (in the form of a (pre-established) pattern (and/or consisting of consecutive slots)) of a pre-configured length (for example, STS_WIN) before slot N (and/or slot (N-OFFSET) (for example, offset means the minimum time required to process the sensing result))) in the form of a pre-configured pattern to perform only a related sensing operation, within the (pre-configured length) sensing window, based on the time when the actual data (on the LCH and/or on its (L2) buffer) (to be transmitted) is available (and/or a time point at which resource (re)selection is triggered and/or a slot from which a selectable candidate transmission resource is derived within the selection window) (for example, slot N). In consideration of this, the P-UE may perform a partial sensing operation (and/or additional sensing operation of a pre-configured length (in the form of a (pre-configured) pattern (and/or consisting of consecutive slots)) before slot N (and/or slot (N-OFFSET))) in the form of a pre-configured pattern, within a sensing window (of a pre-configured length), based on the time when the data (on LCH and/or on its own (L2) buffer) (to be transmitted) is available (and/or a time point at which resource (re)selection is triggered and/or a slot from which a selectable candidate transmission resource is derived within the selection window) (for example, slot N') predicted (implementational or virtually) by the P-UE. Here, for example, when slot N is later than slot N' (in the time domain), the P-UE may be configured to additionally perform a sensing operation (in the form of a pre-configured length ((pre-configured) pattern (and/or consisting of contiguous slots) (after STS_WIN (which has already been done based on slot N')). For example, when slot N is later than the slot N' (in the time domain), the P-UE may be configured to additionally perform a sensing operation until slot N (and/or slot (N-OFFSET)) (in the form of a (pre-established) pattern (and/or consisting of consecutive slots)) (after STS_WIN (which has already been done based on slot N')).

According to an embodiment of the present disclosure, the P-UE may be configured to perform (additional) sensing (for example, STS_SNS) of a pre-configured length (for example, STS_LNG) (and/or pattern) after and/or before a pre-configured time (for example, slot N). Here, for example, the slot N may be configured as a time point that satisfies the following (partial) conditions. In addition, a slot in which STS_SNS is performed may be designated/defined as a continuous slot (in the time domain).

Ex) When resource (re)selection is triggered
Ex) When data to be transmitted exists on the buffer (or LCH)
Ex) Start point related to the selection window
Ex) End point related to the selection window
Ex) Prior point related to the selection window
Ex) (in a pre-configured sequence number (for example, first or last)) (individual) slot timing from which selectable transmission (time and/or frequency) resources within the selection window are derived (which satisfies a pre-configured minimum number or more)
Ex) Transmission resource time of a pre-configured sequence number (for example, first or last) selected/reserved within the selection window For example, before the P-UE performs (additionally) STS_SNS of STS_LNG (before and/or after slot N), if the P-UE has (already) performed sensing for K slots (on the time domain where STS_SNS is performed and/or the time domain related to STS_LNG and/or the active time related to SL DRX and/or on-duration related to SL DRX) based on a pre-configured type of sensing operation (for example, partial sensing), the P-UE may be configured to perform an STS_LNG-related (additional) sensing operation only for the remaining length and/or time domains (for example, slots) except for K slots in STS_LNG. Here, for example, in this case, the start (and/or pre-configured) time point related to the selection window (and/or a (individual) slot time point (of a pre-configured sequence number (for example, first)) from which a selectable transmission (time and/or frequency) resource within the selection window is derived (which satisfies a pre-configured minimum number or more)) may be interpreted as being shifted (or trailing) by the remaining length (and/or time domain) (and/or pre-configured offset) excluding K slots in STS_LNG. On the other hand, for example, before the P-UE performs (additionally) STS_SNS of STS_LNG (before and/or after slot N), if the P-UE has not performed a sensing operation (for example, partial sensing) (in the time domain in which STS_SNS is performed and/or in the time domain related to STS_LNG and/or on the active time related to SL DRX and/or on-duration related to SL DRX), the P-UE may be configured to perform a (additional) sensing operation of the STS_LNG length. Here, for example, in this case, the selection window-related start (and/or pre-configured) time point (and/or a (individual) slot time point (of a pre-configured sequence number (for example, first)) from which a selectable transmission (time and/or frequency) resource within the selection window is derived (which satisfies a pre-configured minimum number or more)) may be interpreted as being shifted (or trailing) by the length (and/or time domain) (and/or pre-configured offset) of STS_LNG. For example, the proposed rule may be limitedly applied when the P-UE needs to perform STS_SNS of STS_LNG before (offset pre-configured with reference from) the selection window-related start (and/or pre-configured) time point (and/or a (individual) slot time point (of a pre-configured sequence number (for example, first)) from which a selectable transmission (time and/or frequency) resource within the selection window is derived (which satisfies a pre-configured minimum number or more)). In addition, for example, if the P-UE cannot monitor and/or sense some slots (for example, NON_MSLT) due to its transmission (for example, PSCCH/PSSCH TX, UL TX, LTE SL TX) and the like in the STS_LNG related time domain, the P-UE may be configured to perform an additional sensing operation as much as NON_MSLT (for example, a type in which (additional) sensing operation for a time domain having a length of STS_LNG is (always) guaranteed). Otherwise, for example, if the P-UE cannot monitor and/or sense some slots (for example, NON_MSLT) due to its transmission (for example, PSCCH/PSSCH TX, UL TX, LTE SL TX) and the like in the STS_LNG related time domain, the P-UE may be configured to perform a sensing operation only for the remaining time domains except for NON_MSLT in STS_LNG. For example, if NON_MSLT exists, the P-UE may assume that transmission related to a pre-configured period value (set) (among the values configured as selectable resource reservation cycle values within the resource pool) (and/or its own transmission reservation period value and/or selectable maximum (and/or minimum and/or (weight) average) resource reservation period value within the resource pool) (for example, P_VAL) is (virtually) performed on NON_MSLT (for example, slot K), the P-UE may exclude candidate resources (for example, slots) overlapping the relevant slot (K+P_VAL) within the selection window, and/or the P-UE may be configured not to apply the operation of excluding the NON_MSLT-related transmission resource candidate (exceptionally) within the selection window. In addition, for example, when the P-UE selects a (individual) slot (for example, Y_SLOT) from which a selectable transmission (time and/or frequency) resource within the selection window is derived (which satisfies a pre-configured minimum number or more), the P-UE may be configured to restrictively (or preferentially or maximally) designate a slot in which STS_SNS of STS_LNG is performed (by including partial sensing and/or SL DRX related active time and/or SL DRX related on-duration, and the like). For example, when the P-UE selects a (individual) slot (for example, Y_SLOT) from which a selectable transmission (time and/or frequency) resource within the selection window is derived (which satisfies a pre-configured minimum number or more), the P-UE may be configured to restrictively (or preferentially or maximally) designate a slot in which STS_SNS of STS_LNG is performed (by including partial sensing and/or SL DRX related active time and/or SL DRX related on-duration, and the like). Here, for example, when the corresponding rule is applied, it can be interpreted that the Y_SLOT position is shifted (or followed) to a time point after STS_SNS of STS_LNG. In the present disclosure, for example, STS_LNG may include (maximum of or minimum of) the SL DRX area (composed of consecutive slots) and/or the area in which a pre-configured type of sensing (for example, partial sensing) is performed.

According to an embodiment of the present disclosure, if the following (some) conditions are satisfied, a UE performing SL communication may be configured to transmit (via PUCCH and/or PSFCH) ACK information (to a base station and/or a counterpart (peer/target) UE).

Ex) When the (L2) buffer (related to the linked SL process (ID)) is flushed

Ex) When the (some) events described below occur

Here, for example, the above situation may be a case in which the TX UE receives ACK information (via PSFCH) from the RX UE. For example, the above situation may be a case in which the RX UE transmits ACK information to the TX UE (after receiving/decoding the packet successfully). For example, the above situation is that the RX UE sends ACK information (via PSFCH) to the TX UE, but due to a PSFCH (and/or SL HARQ feedback information) detection error (for example, a situation in which the TX UE misinterprets that the TX UE has received NACK information (and/or the TX UE misinterprets that the RX UE did not perform PSFCH transmission)), the RX UE receives a retransmission packet (related to the same SL HARQ (ID)) from the TX UE. For example, the above situation may be a case in which the mode 1 TX UE determines that the (corresponding) packet-related PDB is exceeded (when performing a packet transmission operation based on the transmission resource allocated from the base station). For example, the above situation may be a case where it is determined that the mode 1 TX UE will not be able to perform transmission in the (corresponding) packet-related PDB (when performing a packet transmission operation based on the transmission resource allocated from the base station). For example, the above situation may be a case in which a pre-configured maximum number of retransmissions (for each priority and/or mode 1 SL CG) is reached when packet transmission is performed. For example, the above situation may be a case in which a pre-configured maximum number of retransmissions (for each priority and/or mode 1 SL CG) is exceeded when packet transmission is performed.

According to an embodiment of the present disclosure, when the UE performs resource (re)selection, if available data (on LCH and/or (L2) buffer) has SL HARQ feedback DISABLED characteristic, if the related SL grant is created on the resource pool in which the PSFCH resource is configured, the UE may perform the LCP operation related to the generation of a MAC PDU to be transmitted using the (corresponding) SL grant-related resource. In this case, only when the time gap between the two selection/reservation resources satisfies the pre-configured minimum HARQ RTT, the UE may be allowed/configured to generate a MAC PDU having the SL HARQ feedback ENABLED characteristic (via LCP), the UE may be allowed/configured to transmit the MAC PDU through the corresponding (SL grant-related) selection/reservation resource. For example, when there are two selection/reservation resources that do not satisfy the minimum HARQ RTT configured in advance, the UE may be allowed/configured to generate (via LCP) only a MAC PDU having the SL HARQ feedback DISABLED characteristic, the UE may be allowed/configured to transmit the MAC PDU through the corresponding (SL grant-related) selection/reservation resource.

For example, whether to apply the above rule (and/or parameter values related to the proposed method/rule of the present disclosure) may be specifically (or differently or independently) configured/allowed (and/or the above rules may be restrictively configured/allowed) for at least one of the elements/parameters (or for at least, by one) of service type (and/or (LCH or service) priority and/or QoS requirements (for example, latency, reliability, minimum communication range) and/or PQI parameters) (and/or HARQ feedback ENABLED (and/or DISABLED) LCH/MAC PDU (transmission), and/or CBR measurement value of the resource pool, and/or SL cast type (for example, unicast, groupcast, broadcast), and/or SL groupcast HARQ feedback option (for example, NACK ONLY feedback, ACK/NACK feedback, NACK ONLY feedback based on TX-RX distance), and/or SL mode 1 CG type (for example, SL CG type 1/2), and/or SL mode type (for example, mode 1/2), and/or resource pools, and/or whether the resource pool in which the PSFCH resource is configured, and/or when periodic resource reservation operation (and/or aperiodic resource reservation operation) is allowed/configured (or not allowed/configured) on the resource pool, and/or when partial sensing operation (and/or random resource selection operation (and/or full sensing operation)) is allowed/configured (or not allowed/configured) on the resource pool, and/or source (L2) ID (and/or destination (L2) ID), and/or PC5 RRC connection link, and/or SL Link, and/or connection state (with base station) (for example, RRC CONNECTED state, IDLE state, INACTIVE state), and/or SL HARQ process (ID) and/or whether SL DRX operation (of TX UE or RX UE) is performed, and/or whether it is power saving (TX or RX) UE, and/or when (in a specific UE point of view) PSFCH TX and PSFCH RX (and/or a plurality of PSFCH TX (exceeds UE CAPABILITY)) are overlapped each other (and/or PSFCH TX (and/or PSFCH RX) is omitted), and/or when the RX UE actually (successfully) receives the PSCCH (and/or PSSCH) (re)transmission from the TX UE, and/or a UE performing partial sensing (and/or (no sensing) random selection (and/or full sensing)) based resource selection, and/or a UE performing a periodic (for example, a plurality of MAC PDUs) (and/or aperiodic (for example, single MAC PDU)) resource reservation operation, and/or a UE performing periodic (and/or aperiodic) packet transmission, and/or when the sensing operation is not performed before the resource (re)selection triggering time (and/or presence of the data on the buffer (or LCH)), etc.

In the present disclosure, the terms of "configuration" (or "designation") may be interpreted broadly as a form in which the base station informs the terminal through a predefined (physical layer or higher layer) channel/signal (for example, SIB, RRC, MAC CE) (and/or a form provided through pre-configuration and/or a form in which the UE informs other UEs through a predefined (physical layer or higher layer) channel/signal (for example, SL MAC CE, PC5 RRC)), etc.

In this disclosure, the terms of PSFCH may be interpreted broadly as (NR or LTE) PSSCH (and/or (NR or LTE) PSCCH) (and/or (NR or LTE) SL SSB (and/or UL channel/signal)).

The proposed methods of the present disclosure can be used in combination with each other (in a new form of a method).

In this disclosure, the terms of power saving and/or SL DRX may be interpreted broadly as resource selection based on partial sensing and/or resource selection based on random selection.

According to various embodiments of the present disclosure, when the P-UE performing CPS is not guaranteed the minimum number of slots required for sensing, the P-UE may select a resource within the selection window based on random selection or may select a resource within Y slots within the selection window based on a sensing result for a number of slots smaller than the minimum number of slots. By performing the above operation according to the situation of the P-UE, a power saving effect can be obtained or the reliability of SL communication can be obtained as much as possible.

Figure 13:
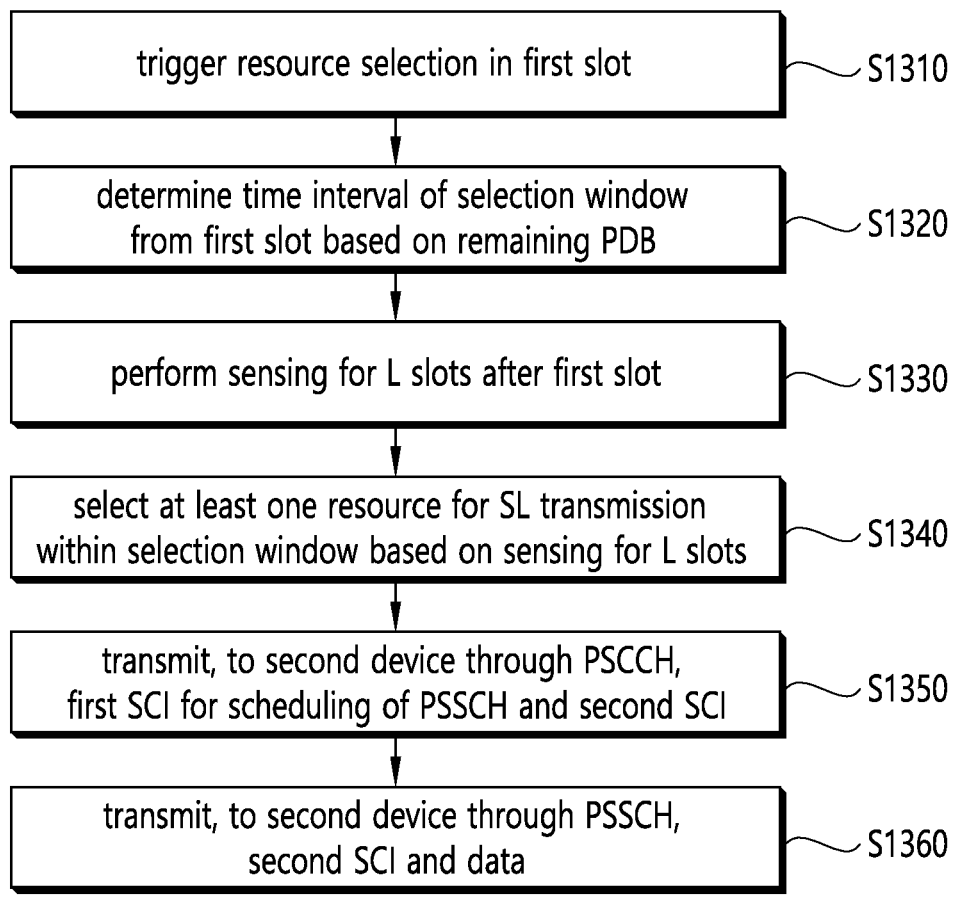
FIG. 13 illustrates a method for a first device to perform wireless communication, according to an embodiment of the present disclosure.

FIG. 13 illustrates a method for a first device to perform wireless communication, according to an embodiment of the present disclosure. The embodiment of FIG. 13 may be combined with various embodiments of the present disclosure.

Referring to FIG. 13, in step S1310, the first device may trigger resource selection in the first slot. In step S1320, the first device may determine a time interval of the selection window from the first slot, based on a remaining packet delay budget (PDB). For example, the selection window may include Y candidate slots. In step S1330, the first device may perform sensing for L slots after the first slot. In step S1340, the first device may select at least one resource for sidelink (SL) transmission within the selection window based on the sensing for the L slots. In step S1350, the first device may transmit, to the second device through a physical sidelink control channel (PSCCH), the first SCI for scheduling of a physical sidelink shared channel (PSSCH) and second sidelink control information (SCI). In step S1360, the first device may transmit the second SCI and data to the second device through the PSSCH. For example, based on the L is smaller than the minimum number of slots for the sensing, the at least one resource may be selected based on a random selection within the selection window, or the at least one resource may be selected within the Y candidate slots based on the sensing for the L slots. The Y may be a positive integer. The L may be a positive integer.

For example, the L slots may be L slots belonging to a resource pool located after the first slot.

For example, the number of slots belonging to the resource pool between the first slot and the first slot among the Y candidate slots in the selection window may be smaller than the minimum number of the slots.

For example, the first slot among the Y candidate slots may be located after the first processing time and the second processing time from the last slot among the L slots. For example, the first processing time may be a time required for the first device to process a result of the sensing, the second processing time may be a time required for processing of the first device to select the at least one resource based on the result of the sensing.

Additionally, for example, the first device may obtain an SL discontinuous reception (DRX) configuration including information related to an active time of the second device. For example, the at least one resource may include at least one first resource selected within the active time and at least one second resource selected outside the active time. For example, a ratio between the number of the at least one first resource and the number of the at least one second resource may be configured for the first device. For example, the minimum number of the at least one first resource or the number of the at least one second resource may be configured for the first device.

For example, the minimum number of the Y candidate slots may be configured for the first device.

For example, the Y candidate slots may be selected by the first device so that the L may be greater than or equal to the minimum number of slots for the sensing.

For example, the minimum number of slots may be configured for the first device.

For example, the minimum number of slots may be configured for each resource pool.

The proposed method may be applied to an apparatus according to various embodiments of the present disclosure. First, the processor 102 of the first device 100 may trigger resource selection in the first slot. In addition, the processor 102 of the first device 100 may determine a time interval of the selection window from the first slot based on a remaining packet delay budget (PDB). For example, the selection window may include Y candidate slots. In addition, the processor 102 of the first device 100 may perform sensing for L slots after the first slot. In addition, the processor 102 of the first device 100 may select at least one resource for sidelink (SL) transmission within the selection window based on the sensing of the L slots. In addition, the processor 102 of the first device 100 may control the transceiver 106 to transmit, to a second device, a first SCI for scheduling of a physical sidelink shared channel (PSSCH) and a second sidelink control information (SCI) through a physical sidelink control channel (PSCCH). In addition, the processor 102 of the first device 100 may control the transceiver 106 to transmit, to the second device, the second SCI and data through the PSSCH. For example, based on that the L is smaller than the minimum number of slots for sensing, the at least one resource may be selected based on a random selection within the selection window, or the at least one resource may be selected within the Y candidate slots based on the sensing for the L slots. The Y may be a positive integer. The L may be a positive integer.

According to an embodiment of the present disclosure, a first device for performing wireless communication may be provided. For example, the first device may comprise one or more memories storing instructions; one or more transceivers; and one or more processors connected to the one or more memories and the one or more transceivers. For example, the one or more processors may execute the instructions to: trigger resource selection in a first slot; determine a time interval of a selection window from the first slot based on a remaining packet delay budget (PDB), wherein the selection window includes Y candidate slots; perform sensing for L slots after the first slot; select at least one resource for sidelink (SL) transmission within the selection window based on the sensing for the L slots; transmit, to a second device through a physical sidelink control channel (PSCCH), a first sidelink control information (SCI) for scheduling of a physical sidelink shared channel (PSSCH) and a second SCI; and transmit, to the second device through the PSSCH, the second SCI and data. For example, based on the L being smaller than a minimum number of slots for the sensing, the at least one resource may be selected based on random selection within the selection window, or the at least one resource may be selected from the Y candidate slots based on the sensing for the L slots. The Y may be a positive integer. The L may be a positive integer.

According to an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: trigger resource selection in a first slot; determine a time interval of a selection window from the first slot based on a remaining packet delay budget (PDB), wherein the selection window includes Y candidate slots; perform sensing for L slots after the first slot; select at least one resource for sidelink (SL) transmission within the selection window based on the sensing for the L slots; transmit, to a second device through a physical sidelink control channel (PSCCH), a first sidelink control information (SCI) for scheduling of a physical sidelink shared channel (PSSCH) and a second SCI; and transmit, to the second device through the PSSCH, the second SCI and data. For example, based on the L being smaller than a minimum number of slots for the sensing, the at least one resource may be selected based on random selection within the selection window, or the at least one resource may be selected from the Y candidate slots based on the sensing for the L slots. The Y may be a positive integer, and the L may be a positive integer.

According to an embodiment of the present disclosure, a non-transitory computer-readable storage medium storing instructions may be provided. For example, the instructions, when executed, cause a first device to: trigger resource selection in a first slot; determine a time interval of a selection window from the first slot based on a remaining packet delay budget (PDB), wherein the selection window includes Y candidate slots; perform sensing for L slots after the first slot; select at least one resource for sidelink (SL) transmission within the selection window based on the sensing for the L slots; transmit, to a second device through a physical sidelink control channel (PSCCH), a first sidelink control information (SCI) for scheduling of a physical sidelink shared channel (PSSCH) and a second SCI; and transmit, to the second device through the PSSCH, the second SCI and data. For example, based on the L being smaller than a minimum number of slots for the sensing, the at least one resource may be selected based on random selection within the selection window, or the at least one resource may be selected from the Y candidate slots based on the sensing for the L slots. The Y may be a positive integer, and the L may be a positive integer.

Figure 14:
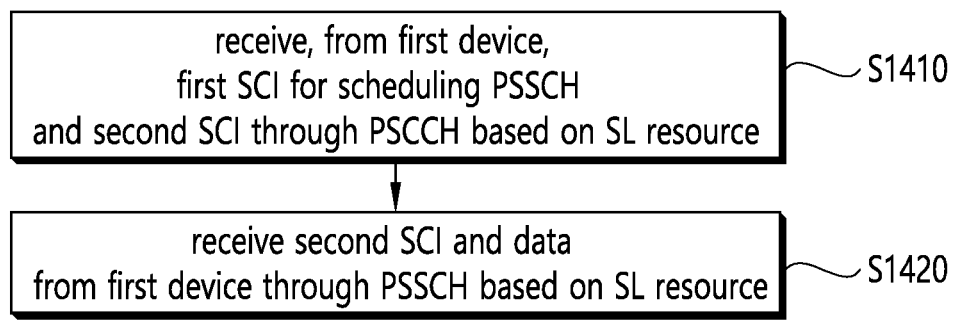
FIG. 14 shows a method for a second device to perform wireless communication, according to an embodiment of the present disclosure.

FIG. 14 shows a method for a second device to perform wireless communication, according to an embodiment of the present disclosure. The embodiment of FIG. 14 may be combined with various embodiments of the present disclosure.

Referring to FIG. 14, in step S1410, the second device may receive, from a first device, a first SCI for scheduling a physical sidelink shared channel (PSSCH) and second sidelink control information (SCI) through a physical sidelink control channel (PSCCH) based on a sidelink (SL) resource. In step S1420, the second device may receive the second SCI and data from the first device through the PSSCH based on the SL resource. For example, the SL resource may be selected within a selection window based on sensing of L slots related to the selection window including Y candidate slots. For example, based on that the L is smaller than the minimum number of slots for the sensing, the SL resource may be selected based on random selection within the selection window, or the SL resource may be selected among the Y candidate slots based on the sensing of the L slots. The Y may be a positive integer, and the L may be a positive integer.

The proposed method may be applied to an apparatus according to various embodiments of the present disclosure. First, the processor 202 of the second device 200 may control the transceiver 206 to receive, from a first device, a first SCI for scheduling a physical sidelink shared channel (PSSCH) and second sidelink control information (SCI) through a physical sidelink control channel (PSCCH) based on a sidelink (SL) resource. And the processor 202 of the second device 200 may control the transceiver 206 to receive the second SCI and data from the first device through the PSSCH based on the SL resource. For example, the SL resource may be selected within a selection window based on sensing of L slots related to the selection window including Y candidate slots. For example, based on that the L is smaller than the minimum number of slots for the sensing, the SL resource may be selected based on random selection within the selection window, or the SL resource may be selected among the Y candidate slots based on the sensing of the L slots. The Y may be a positive integer, and the L may be a positive integer.

According to an embodiment of the present disclosure, a second device configured to perform wireless communication may be provided. For example, the second device may comprise one or more memories storing instructions; one or more transceivers; and one or more processors connected to the one or more memories and the one or more transceivers. For example, the one or more processors execute the instructions to: receive, from a first device, a first SCI for scheduling a physical sidelink shared channel (PSSCH) and second sidelink control information (SCI) through a physical sidelink control channel (PSCCH) based on a sidelink (SL) resource; and receive the second SCI and data from the first device through the PSSCH based on the SL resource. For example, the SL resource may be selected within a selection window based on sensing for L slots related to the selection window including Y candidate slots. For example, based on that the L is smaller than the minimum number of slots for the sensing, the SL resource may be selected based on random selection within the selection window, or the SL resource may be selected among the Y candidate slots based on the sensing of the L slots. The Y may be a positive integer, and the L may be a positive integer.

According to an embodiment of the present disclosure, an apparatus configured to control a second user equipment (UE) performing wireless communication may be provided. For example, the apparatus may comprise: one or more processors; and one or more memories operably connected to the one or more processors and storing instructions. For example, the one or more processors may execute the instructions to: receive, from the first UE, a first SCI for scheduling a physical sidelink shared channel (PSSCH) and second sidelink control information (SCI) through a physical sidelink control channel (PSCCH) based on a sidelink (SL) resource; and receive the second SCI and data from the UE device through the PSSCH based on the SL resource. For example, the SL resource may be selected within a selection window based on sensing for L slots related to the selection window including Y candidate slots. For example, based on that the L is smaller than the minimum number of slots for the sensing, the SL resource may be selected based on random selection within the selection window, or the SL resource may be selected among the Y candidate slots based on the sensing of the L slots. The Y may be a positive integer, and the L may be a positive integer.

According to an embodiment of the present disclosure, a non-transitory computer-readable storage medium storing instructions may be provided. For example, the instructions, when executed, cause a second device to: receive, from a first device, a first SCI for scheduling a physical sidelink shared channel (PSSCH) and second sidelink control information (SCI) through a physical sidelink control channel (PSCCH) based on a sidelink (SL) resource; and receive the second SCI and data from the first device through the PSSCH based on the SL resource. For example, the SL resource may be selected within a selection window based on sensing for L slots related to the selection window including Y candidate slots. For example, based on that the L is smaller than the minimum number of slots for the sensing, the SL resource may be selected based on random selection within the selection window, or the SL resource may be selected among the Y candidate slots based on the sensing of the L slots. The Y may be a positive integer, and the L may be a positive integer.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
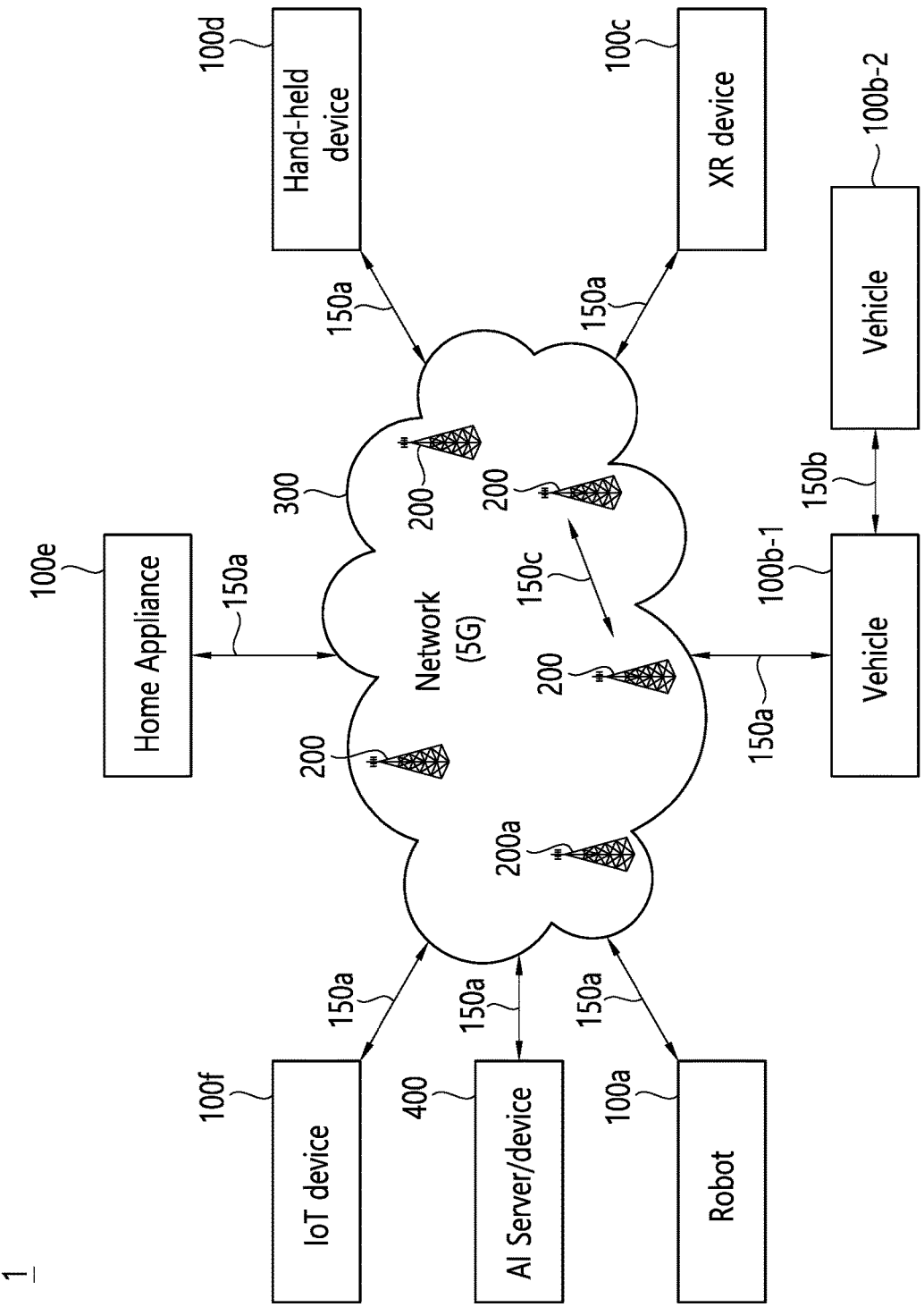
FIG. 15 shows a communication system 1, based on an embodiment of the present disclosure.

FIG. 15 shows a communication system 1, based on an embodiment of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
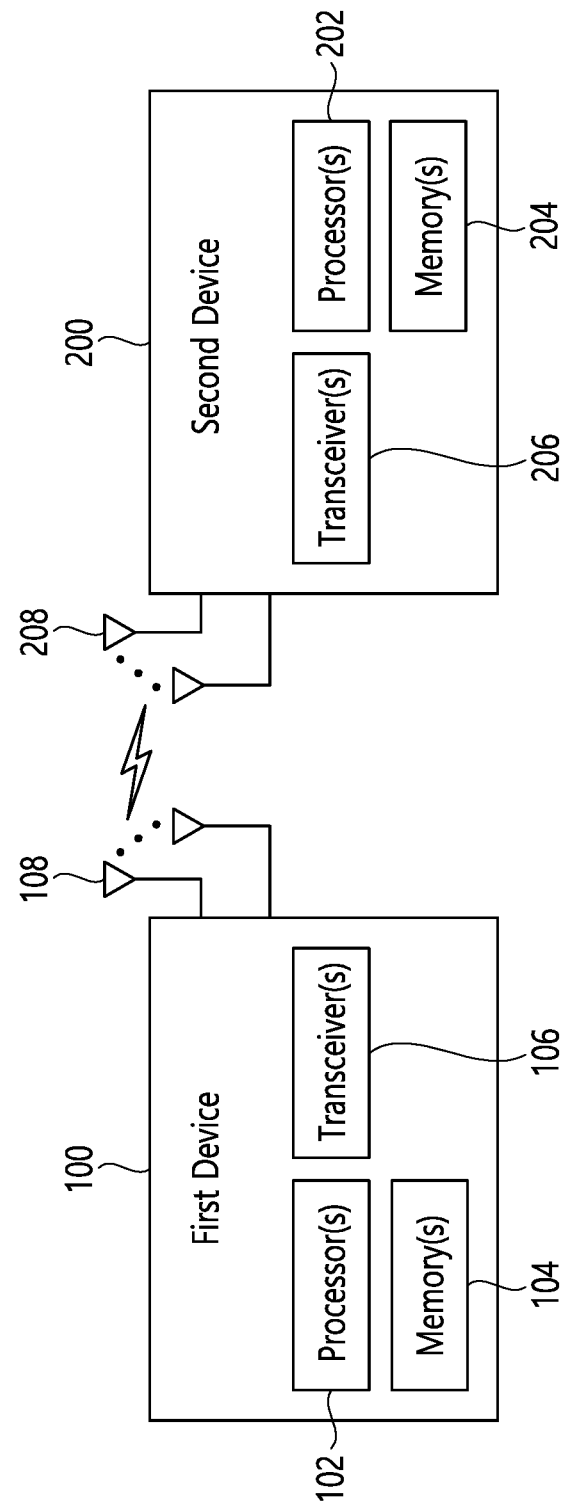
FIG. 16 shows wireless devices, based on an embodiment of the present disclosure.

FIG. 16 shows wireless devices, based on an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
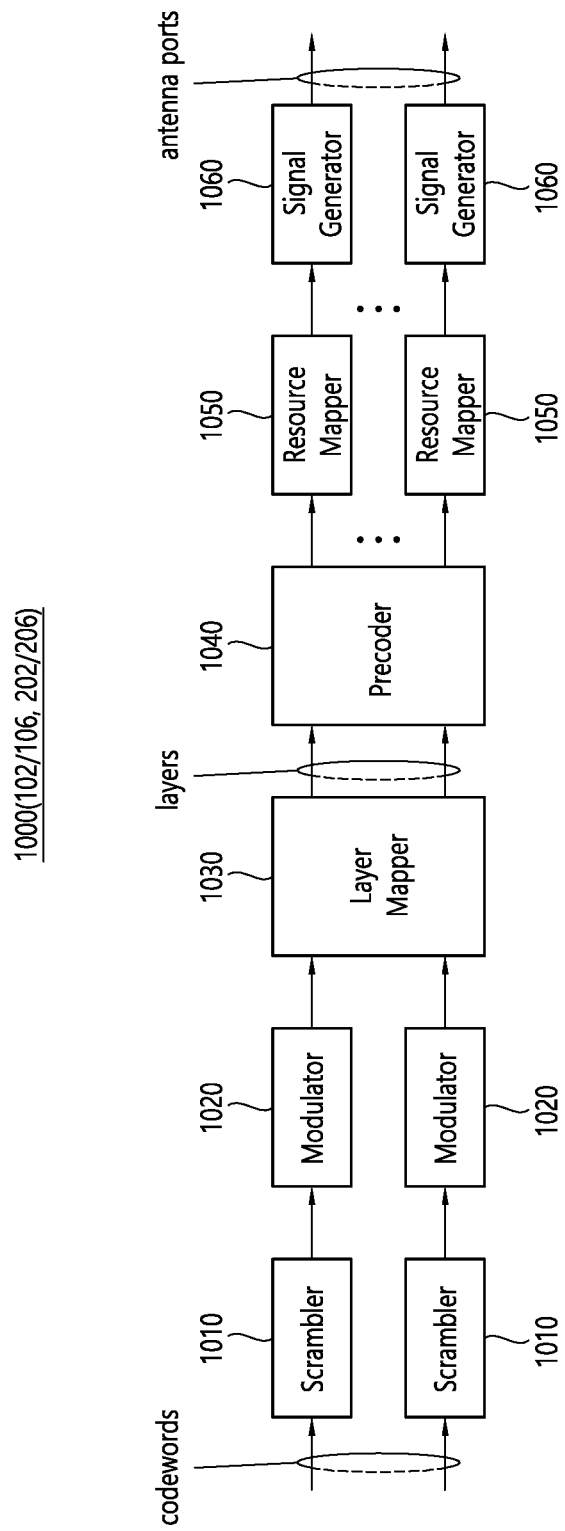
FIG. 17 shows a signal process circuit for a transmission signal, based on an embodiment of the present disclosure.

FIG. 17 shows a signal process circuit for a transmission signal, based on an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
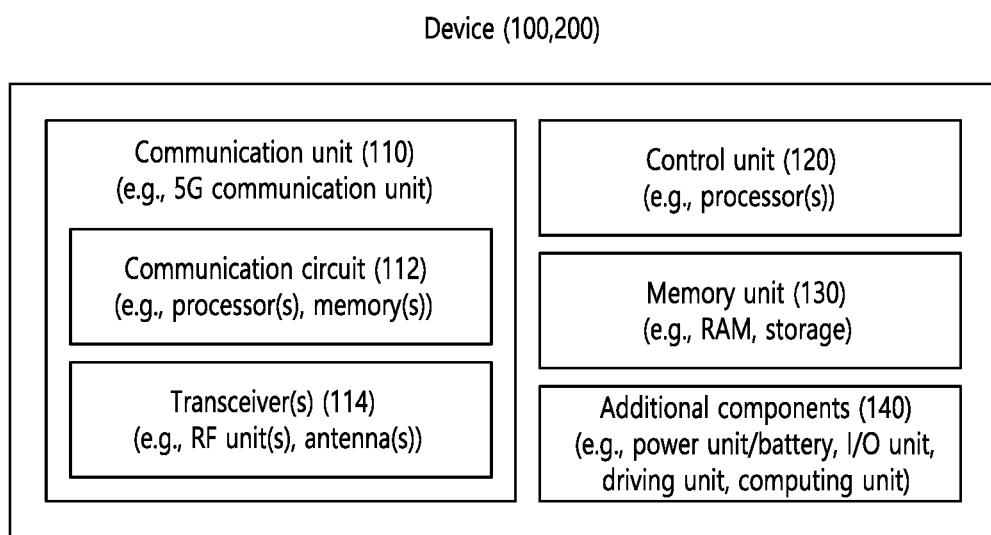
FIG. 18 shows another example of a wireless device, based on an embodiment of the present disclosure.

FIG. 18 shows another example of a wireless device, based on an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
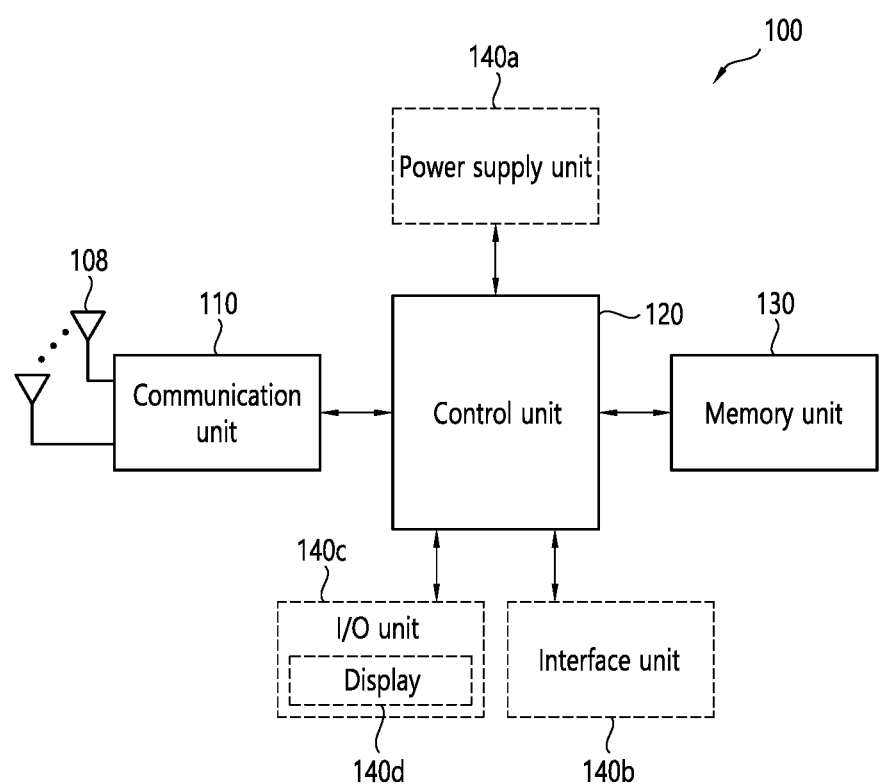
FIG. 19 shows a hand-held device, based on an embodiment of the present disclosure.

FIG. 19 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 20:
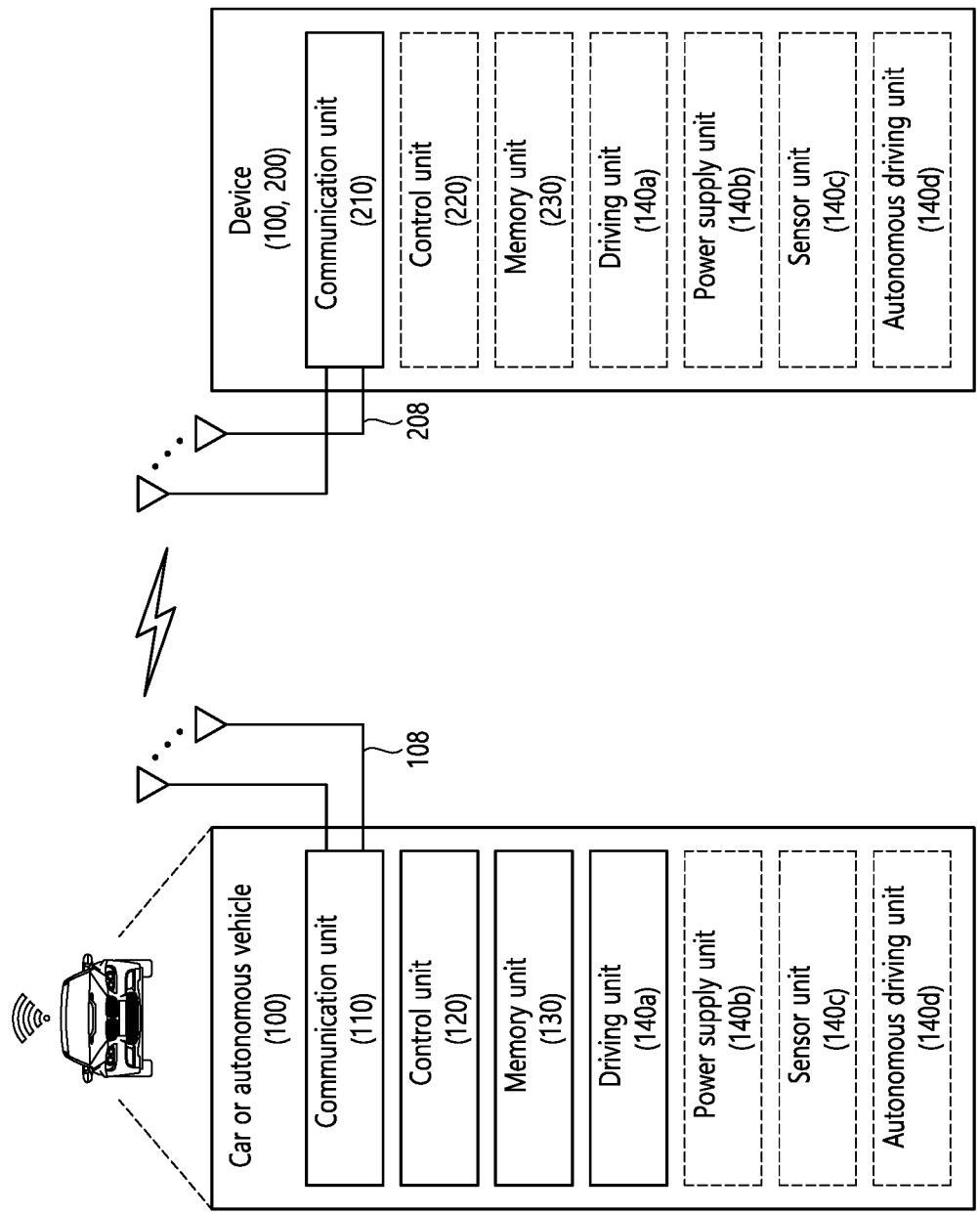
FIG. 20 shows a vehicle or an autonomous vehicle, based on an embodiment of the present disclosure.

FIG. 20 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a device, the method comprising:
   triggering resource selection in a slot;
   determining, based on the triggering, a time interval of a selection window from the slot based on a remaining packet delay budget (PDB), wherein the selection window includes Y candidate slots;

performing partial sensing for L slots from the slot and before a first slot of the Y candidate slots of the selection window; and selecting at least one resource for sidelink (SL) transmission, wherein, based on the L being smaller than a minimum number of slots configured for the partial sensing, the selecting the at least one resource comprises: (i) randomly selecting the at least one resource, or (ii) selecting the at least one resource within the Y candidate slots based on the partial sensing, wherein the Y is a positive integer, and wherein the L is a positive integer.

2. The method of claim 1, wherein the randomly selecting the at least one resource comprises randomly selecting the at least one resource based on the remaining PDB.

3. The method of claim 1, wherein the first slot of the Y candidate slots of the selection window is a first occurring slot of the Y candidate slots of the selection window.

4. The method of claim 1, wherein the L slots are L slots belonging to a resource pool, located from the slot in which the resource selection is triggered.

5. The method of claim 4, wherein a number of the L slots belonging to the resource pool from the slot and before the first slot of the Y candidate slots of the selection window is smaller than the minimum number of slots.

6. The method of claim 1, wherein the first slot of the Y candidate slots is located after a first processing time and a second processing time from a last slot of the L slots.

7. The method of claim 6, wherein the first processing time is a time required for the first device to process a result of the partial sensing, and wherein the second processing time is a time required for the first device to select the at least one resource based on the result of the partial sensing.

8. The method of claim 1, further comprising:

obtaining an SL discontinuous reception (DRX) configuration including information related to an active time of the second device.

9. The method of claim 8, wherein the at least one resource includes at least one first resource selected within the active time and at least one second resource selected outside the active time.

10. The method of claim 1, wherein a minimum number of the Y candidate slots is configured for the first device.

11. The method of claim 1, wherein, based on the L being greater than or equal to the minimum number of slots configured for the partial sensing, the selecting the at least one resource comprises selecting the at least one resource within the Y candidate slots based on the partial sensing, and wherein the Y candidate slots are selected by the first device so that the L is greater than or equal to the minimum number of slots configured for the partial sensing.

12. The method of claim 1, wherein the minimum number of slots is configured for the first device.

13. The method of claim 1, wherein the minimum number of slots is configured for the first device through a resource pool configuration.

14. A first device adapted to perform wireless communication, the first device comprising:

at least one transceiver;

at least one processor; and at least one memory connected to the at least one processor and storing instructions that, based on being executed by the at least one processor, perform operations comprising:

triggering resource selection in a slot;

determining, based on the triggering, a time interval of a selection window from the slot based on a remaining packet delay budget (PDB), wherein the selection window includes Y candidate slots;

performing partial sensing for L slots from the slot and before a first slot of the Y candidate slots of the selection window; and selecting at least one resource for sidelink (SL) transmission, wherein, based on the L being smaller than a minimum number of slots configured for the partial sensing, the selecting the at least one resource comprises: (i) randomly selecting the at least one resource, or (ii) selecting the at least one resource within the Y candidate slots based on the partial sensing, wherein the Y is a positive integer, and wherein the L is a positive integer.

15. The first device of claim 14, wherein the randomly selecting the at least one resource comprises randomly selecting the at least one resource based on the remaining PDB.

16. The first device of claim 14, wherein the first slot of the Y candidate slots of the selection window is a first occurring slot of the Y candidate slots of the selection window.

17. The first device of claim 14, wherein the L slots are L slots belonging to a resource pool, located from the slot in which the resource selection is triggered.

18. The first device of claim 14, wherein the minimum number of slots is configured for the first device.

19. A processing device adapted to control a first device performing wireless communication, the processing device comprising:

at least one processor; and at least one memory connected to the at least one processor and storing instructions that, based on being executed by the at least one processor, perform operations comprising:

triggering resource selection in a slot;

determining, based on the triggering, a time interval of a selection window from the slot based on a remaining packet delay budget (PDB), wherein the selection window includes Y candidate slots;

performing partial sensing for L slots from the slot and before a first slot of the Y candidate slots of the selection window; and selecting at least one resource for sidelink (SL) transmission, wherein, based on the L being smaller than a minimum number of slots configured for the partial sensing, the selecting the at least one resource comprises: (i) randomly selecting the at least one resource, or (ii) selecting the at least one resource within the Y candidate slots based on the partial sensing, wherein the Y is a positive integer, and wherein the L is a positive integer.

20. The processing device of claim 19, wherein the randomly selecting the at least one resource comprises randomly selecting the at least one resource based on the remaining PDB.

* * * * *